United States Patent [19]

Petrillo

[11] Patent Number: 5,035,439
[45] Date of Patent: Jul. 30, 1991

[54] METHOD AND MEANS FOR PROVIDING REAR STEERABILITY IN A TRAILER ASSEMBLY

[76] Inventor: Patrick G. Petrillo, R.D. 2, Box 344, Milford, N.J. 08848

[21] Appl. No.: 346,038

[22] Filed: May 2, 1989

[51] Int. Cl.⁵ .................. B60G 11/26; B62D 1/02; B62D 13/00
[52] U.S. Cl. ............... 280/81.6; 280/43.23; 280/81.5; 280/149.2; 280/426; 280/704
[58] Field of Search .................. 280/81.6, 81.5, 81.1, 280/149.2, 149.1, 43.23, 423.1, 426, 704, 656; 180/24.02, 209

[56] References Cited

U.S. PATENT DOCUMENTS

| 2,502,946 | 4/1950 | Hart | 280/680 |
|---|---|---|---|
| 2,698,758 | 1/1955 | Ronning | 280/686 |
| 2,698,759 | 1/1955 | Ronning | 280/423.1 |
| 2,888,268 | 5/1959 | Fellabaum et al. | 280/81.6 |
| 3,048,422 | 8/1962 | Payne et al. | 280/81.5 |
| 3,120,398 | 2/1964 | Butterworth | 180/199 |
| 3,175,841 | 3/1965 | Smith | 280/683 |
| 3,235,285 | 2/1966 | Tenenbaum et al. | 280/423.1 |
| 3,285,621 | 11/1966 | Turner, Jr. | 280/81.1 |
| 3,334,912 | 8/1967 | Mauck | 280/81.6 |
| 3,390,895 | 7/1968 | Verdi | 180/24.02 |
| 3,533,644 | 10/1970 | Humes | 280/426 |
| 3,704,896 | 12/1972 | Buelow | 280/81.6 |
| 3,899,188 | 8/1975 | Curry | 280/81.6 |
| 3,930,669 | 1/1976 | Kollander et al. | 280/426 |
| 4,084,833 | 4/1978 | Mohrbacker et al. | 280/81.6 |
| 4,161,325 | 7/1979 | Schneider | 280/81.1 |
| 4,186,814 | 2/1980 | Hart | 180/24.02 |
| 4,244,596 | 1/1981 | Chung | 280/426 |
| 4,314,709 | 2/1982 | Silbernagel | 280/81.6 |
| 4,373,738 | 2/1983 | Lange | 280/81.5 |
| 4,383,696 | 5/1983 | Picard | 280/81.1 |
| 4,383,698 | 5/1983 | Felburn | 280/426 |
| 4,398,738 | 6/1983 | McDaniel | 280/81.1 |
| 4,449,726 | 5/1984 | Strifler | 280/81.6 |
| 4,501,437 | 2/1989 | Becker | 280/704 |
| 4,524,841 | 6/1985 | Waggoner | 280/81.6 |
| 4,553,773 | 11/1985 | Pierce | 280/676 |
| 4,616,726 | 10/1986 | Johansson | 180/135 |
| 4,705,133 | 11/1987 | Christenson | 180/209 |
| 4,711,464 | 12/1987 | Bilas | 280/704 |
| 4,856,814 | 8/1988 | Jones | 280/704 |

FOREIGN PATENT DOCUMENTS 2502525 8/1975 Fed. Rep. of Germany ..... 280/81.6

OTHER PUBLICATIONS

"Trailer Primary Air Suspensions"—Dyneer—Granning Division Doc. idc Lafayette, IN 687 GI 10 M.
"Newway Trailer Air Suspensions"—Newway—A Division of Lear Siegler Industries Limited—Publication 742—Printed in U.S.A.

Primary Examiner—Mitchell J. Hill
Attorney, Agent, or Firm—O'Keefe & Wilkinson

[57] ABSTRACT

A tractor trailer or other truck or vehicle is equipped with an auxiliary rear steering arrangement in which one or both sets of dual wheels are equipped for vertical movement and/or a pivoted turning movement plus locking at various angles of turning. In operation, the weight of the truck and any load on the truck is removed from the dual wheel axle equipped for turning by either extending the other dual wheel to lift the trailer body or by lifting the turning equipped axle. Such axle is then turned and the weight of the truck returned to the turned axle and removed from the adjacent unturned dual axle while the truck is moved causing the trailer to move partly to the side. The wheels are then returned to the starting or road condition.

37 Claims, 11 Drawing Sheets

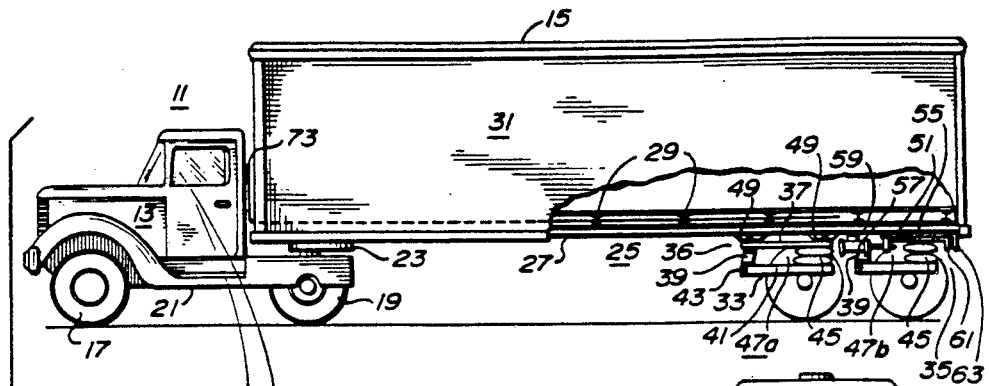
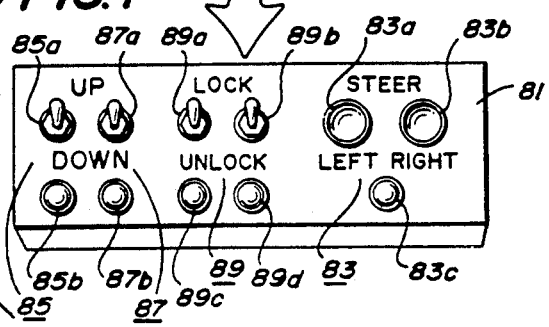
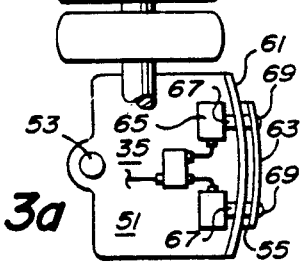
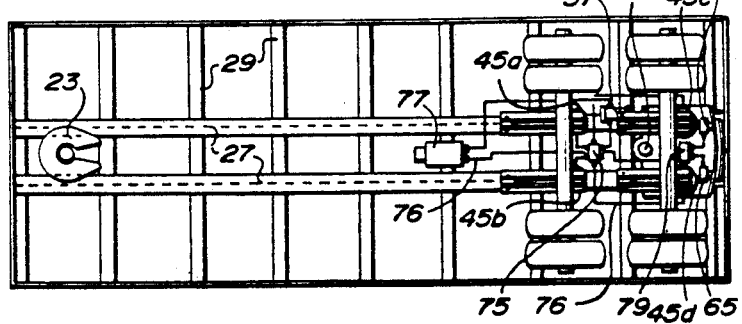
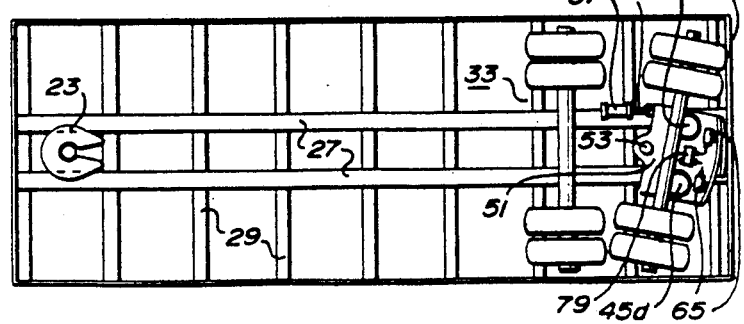

METHOD AND MEANS FOR PROVIDING REAR STEERABILITY IN A TRAILER ASSEMBLY

BACKGROUND OF THE INVENTION (1) Field of the Invention.

The present invention relates generally to a trailer arrangement such as a tractor trailer unit and more particularly to the steering of a tractor trailer unit by turning the wheels of the trailer to increase the maneuverability of the entire unit during parking and operation under close clearance conditions. More particularly still the present invention relates to the operation of tandem or dual axle tractor trailer assemblies or other truck-type vehicles having dual rear axles wherein one or more sets of the wheels on the trailer itself may be steered to provide additional maneuverability in congested traffic, narrow streets and other conditions.

2. Description of the Prior Art.

Tractor trailer assemblies are widely used for the transport of goods over both short and long distances. In order to be economical, such tractor trailer assemblies should have as much capacity as possible. However, road regulations limit the amount of weight which can be accommodated upon a single wheel in order to prevent too much stress from being placed upon a single point upon a highway. Too much stress or weight upon a single point on a highway seriously increases the risk of cracking of the pavement of such highway due to differential stress which tends to force one paving section downwardly while adjoining sections are in effect forced upwardly by adjacent ground pressure Excess pressure i.e. excess weight, applied at a single point or few points upon a highway is generally avoided or relieved by providing multiple wheels upon a truck in order to spread the weight of the truck over as many road contacting points as possible. As is well known to those skilled in the art as well as the general public using the highways, most tractor trailers incorporate at least two separate rear axles, each of which preferably accommodates on each side two large truck wheels and associated tires. A conventional large trailer wheel arrangement therefore distributes the weight of the rear portion of the trailer of a tractor trailer combination over eight separate road contacting points. Additional axles and additional individual tires may be incorporated for particuarly severe load conditions. In particular, and especially with very heavy trucks such as earth and rock-bearing trucks, a third axle may be present, the wheels of which only come into contact with the road surface when the truck is heavily loaded so as to compress the normal suspension sufficiently to bring the auxiliary wheels into contact with the highway. Alternatively, the third axle may be actively lifted from the road surface when not required for weight-bearing purposes.

It is normally desirable to have multiple axles on a truck such as the trailer portion of a tractor trailer assembly spaced from each other along the truck or trailer body in order to distribute the weight of the truck and/or cargo over as wide a portion of the road surface or paving as possible so as to decrease the loading upon any single portion of the road paving, thereby decreasing the tendency of such paving to crack. Since, however, it is necessary for a truck to proceed not only in a straight path, but to deviate from such path to one side or the other, i.e. to turn, it becomes impractical to have the axles spaced far apart since during turning the rear of the truck will pivot either about the rear wheels tending to drag the forward wheels to the side over the road surface or the rear of the trailer assembly will tend to pivot about the set of wheels on the forward axle tending to drag and scuff the tires on the rear axle sidewise across the ground or road surface. In either case, the scuffing and dragging of tires of the wheels on one axle to the side very seriously increases the wear and stress upon the tires and also undesirably stresses the entire truck structure. Which set of tires will be scuffed or dragged sidewise across the ground will depend largely upon the relative spacing of the sets of tires upon the axles of the trailer and the relative weight carried by each axle. If the weight is substantially equal, pivoting of the trailer will usually be about the rear wheels and the forward set of wheels on the forward rear axle will be dragged sidewise as the truck turns, scuffing and wearing out the tires on these wheels. However, if the loading should be greater upon the forward set of wheels due to misadjustment of the weight of the truck or the suspension of the wheels, the turning radius will tend to be about the front set of rear wheels of the truck rather than about the second set of rear wheels of the truck. In this case the rear tires on the truck will tend to be dragged sideways across the road surface and scuffed causing undue wear of the tires and decreasing their service life as well as unduly stressing the structure of the tractor trailer itself. This sidewise movement problem has been recognized for many years, and many schemes for alleviating the scuffing and wear of one or both sets of tires have been suggested. The simplest and the most universally used alleviation scheme involves minimum spacing between the two axles since the farther the axles are spaced from each other, the more one or the other set of tires will be scuffed and dragged sideways upon turning of the truck. In other words, as the axles are moved toward each other, the relative difference in sideways deflection becomes progressively less and if the movement of the tires toward each other could be continued to the ultimate by merging the tires of one axle with the tires of the other axle rendering the two coextensive, no differential sideways movement would occur and no scuffing would take place. Obviously, as a practical matter such close spacing of the tires is unattainable and the closest practical spacing is to have the tires of adjacent wheels within a few inches of each other. Such positioning of the wheels or tires provides the minimum amount of scuffing of the tires upon turning. However, as pointed out above, it also minimizes the advantage gained by spacing the axles so as to space the contact points of the tires upon the road surface and minimize possible cracking of the road surface due to overloading at a particular point on such road surface.

The second most widely suggested expedient to reduce or eliminate scuffing and wear on one set of tires is to provide a turning mechanism for one or more of the axles, or alternatively, for the individual wheels upon the axles, so the tires on the wheels are not dragged across the road surface. If the tires are turned or oriented in the direction of their movement, the wear on the tires can be substantially decreased since the tires and accompanying wheels will be able to rotate about their rotational axes as the wheel and tire is moved over the road surface thus relieving considerable abrasion upon the tires. A large number of schemes have been proposed for steering one or the other of the rear axles of a dual axle truck or tractor trailer assembly in accordance with such general principle.

For example, early arrangements for turning or steering the front set of a dual rear wheel arrangement on an automotive vehicle in order to prevent excessive wear of the tires of such vehicle are set forth in patents 842,245 issued Jan. 29, 1907 and 880,737 issued May 26, 1908 to C. T. Pratt, both for steered axle assemblies for automobiles. The same type of arrangement was applied to a truck type assembly in U.S. Pat. No. 915,733 issued Mar. 23, 1909 to A. E. Brillie. In the Brillie arrangement the wheels on the rearmost axle of the two rear axles turn while the forward-most wheels on the rear of the truck are held stationary with respect to their alignment with the truck body. A further modification involving the steering of the front wheels of a rear truck bogie, or dual wheel mounting, of a tractor trailer is shown in U.S. Pat. No. 1,120,188 issued Dec. 8, 1914 to G. Felty. In this case it is the forward set of a fairly closely spaced set of trailer wheels on a separate bogie which turn. A similar arrangement is shown in U.S. Pat. No. 1,559,050 issued Oct. 27, 1925 to O. D. Schvartz.

Not only have the rear wheels of tractor trailer units and truck units tended to skid or scuff when the vehicles turn, but when dual rear axles with multiple wheels on said axles are used on a truck with the axles fixed generally perpendicular to the longitudinal center line of the vehicle, they have a tendency to cause the entire vehicle to move straight ahead even though the front steering wheels are turned. As a result, both the front, or steering, wheels and the rear wheels have had a tendency to skid when making a turn. This is known generally in the trade as "plowing". Such plowing tendency of the wheels results in an undesirable wear of all of the tires and also makes steering difficult. The use of a tractor trailer arrangement, of course, tends to alleviate plowing of the front or steering wheels since the tractor portion of the truck can turn independently of the trailer portion. However, tractor trailer combinations are subject in some respects to an even more serious problem when there are dual wheels on the trailer since such dual wheels tend also to maintain the trailer moving in a longitudinal straight line. In slippery or other insecure conditions this can easily lead to the phenomena known as "jackknifing" in which the forward momentum of the trailer is applied at an angle to the pivot point of the trailer with the tractor at the location of the so-called "fifth wheel" as the unit turns so that the weight and the momentum of the trailer tends to force the rear of the tractor around in an arc until the tractor portion of the truck is facing almost opposite to the orientation of the trailer portion of the truck. As soon as the tractor portion and the trailer portion of a truck reach an angle close to or greater than a right angle at highway speeds, the tractor has no further control of the trailer. Many serious accidents have resulted and continue to result from jackknifing phenomena.

Since the phenomena of scuffing and tire wear on tractor trailers and "plowing" in unitary large truck constructions are well known problems which have very serious economic and safety ramifications, a great deal of thought has, as pointed out above, been put into developing solutions for such problems by many prior inventors. It has been realized that one way to alleviate such problems would be to make the rear wheels of a dual axle truck either independently steerable or one or more of the rear axles as a unit steerable so that the rear wheels could be either pointed in the direction of movement to alleviate scuffing or could be arranged to steer in the opposite direction in coordination with the steering on the front wheels to maintain a more uniform forwardly oriented movement of the entire vehicle. The usual proposal has been to make the rearmost axles steerable in the same way that the front axle is steerable and to coordinate such rear steering with the front axle so that the rear axle steers in a uniform manner in the opposite direction. Such arrangements have not proved particularly successful and have not come into widespread use due to cost considerations and to the general weakening of the structure entailed by installing the necessary pivots, king pins and the like to facilitate the rear steering action. U. S. Pat. No. 3,930,669 issued Jan. 6, 1976 to Kollander et al. lists in the background of the invention a number of prior patents in which various forms of steerable rear wheels on trailers have been proposed. Furthermore, the list provided by Kollander et al. is only a very partial list of the disclosures to be found in this art. One patent of note is U.S. Pat. No. 3,533,644, issued Oct. 13, 1970 to C. E. Humes which discloses a trailer steering arrangement particularly for alleviating jackknifing. The Hume arrangement uses air-bag-type suspensions on his rotating axles.

In spite of the seriousness of the problems addressed and, therefore, the plurality of solutions proposed in the various prior art references, none of the prior proposals have come into general or, in most cases, even partial use due to certain impracticalities which have been inherent in previous schemes.

Tire wear and handling difficulties due to scuffing during turning, as well as plowing and accidents caused by jackknifing, are by no means the only difficulties implicit in present tractor trailer construction with dual fixed or multiple fixed rear axle constructions. As is well known to those skilled in the art, such tractor trailer arrangements are very difficult to steer in close quarters, particularly when the tractor trailer is large. It is, for example, very difficult to park a tractor trailer combination in a small space or to make turns into narrow streets or other close quarters due to the wide turns which a long tractor trailer combination must make and the inability of the rear load bearing wheels on a trailer to track reliably along the path of the wheels of the tractor. In other words, the rear wheels tend to track more or less directly toward the location of the pivot point of the trailer with the tractor. However, when a sharp turn must be made, the rear axles of the trailer are so far behind the rear axles of the tractor that when negotiating a sharp curve or turn the pivot point between the tractor and the trailer will often have passed around the corner before the rear axles of the trailer even reach the corner. Since, therefore, the rear axles tend to track toward the pivot point of the articulated tractor trailer unit, the rear axles will tend to be drawn into any intervening structure, vehicles or the like which may occupy the corner about which the tractor trailer combination is attempting to turn. Similar difficulties with hook-and-ladder-type fire apparatus, which often must operate in constricted circumstances, have been solved in the past, as is well known in the art and to the general public, by the provision of a special steering station at the rear of the trailer portion of the hook and ladder apparatus, which steering station is manned by a fireman who deliberately steers the rear of the trailer independently about a corner. It will be obvious, however, that a similar arrangement is impractical in tractor trailer combinations in which the major use of the tractor trailer combination is over fairly open highways where such auxiliary steering has no particular use and in which the additional expense of an extra driver to steer the rear of the truck would be economically unfeasible due not only to the extra wages required for compensation of the additional driver, but due to the loss of valuable cargo space incumbent upon the provision of a steering location for an extra driver in the truck structure. Nevertheless, various proposals for providing other steering arrangements have been made in an attempt to provide better maneuverability for the rear portion of not only tractor trailer combinations, but other vehicle types in which difficulty with close-quarter steering and/or parking may be encountered. One solution proposed by some inventors with respect to such close-quarter steering difficulties has been the use of auxiliary wheels which may be normally maintained in retracted position and used only in contact with the ground or road surface when it is desired to move the rear of the truck or other vehicle in a direction contrary to the normal direction in which the wheels of the truck normally track.

Since, as pointed out above, the wheels of the trailer unit of a tractor trailer combination turning a corner follow inside of the curve of the path taken by the tractor unit, the driver, when negotiating a sharp corner, must make a very wide swing with the tractor in order to insure that the rear of the trailer will not cut across the corner thereby running the risk of side swiping any vehicle or other object or structure standing, parked or located inside the trailer's path of travel. Indeed, most automobile drivers have observed large trailer trucks making such wide swings around a corner and have quite likely, at one time or another, been concerned that their own vehicle would be struck by either the tractor swinging wide of the center of the road or by the trailer cutting across the opposite inside corner of the road. Such difficulties are exaggerated by the use of double trailer combinations with the result that many states do not allow plural trailers, and even when they do allow such plural trailers, often restrict them to interstate highways and adjacent feeder road systems. In order to negotiate such sharp turns, it is necessary that the rear wheels of the trailer be turned in the opposite direction from the steering wheels of the tractor unit so that the rear of the trailer is drawn in a wide arc about the curve comparable to the arc taken by the tractor unit. An arrangement for thus steering the rear wheels of a tractor trailer combination is disclosed in U.S. Pat. 3,533,645 issued Oct. 13, 1970 to M. W. Newberry. Other arrangements have been provided by other inventors.

An arrangement for facilitating parking of articulated vehicles such as tractor trailers and the like is shown in U.S. Pat. No. 4,616,726 issued Oct. 14, 1986 to Johansson who provides an auxiliary set of wheels which may be urged into contact with the ground temporarily lifting a normal driving wheel and allowing the rear of a truck to be swung to the side without any forward movement of said truck.

It will be evident from the foregoing discussion that there have been two main problems with large tractor trailer and other large truck combinations so far as negotiating curves and turns is concerned. The first involves tire scuffing and plowing and/or jackknifing resulting from the use of dual sets of fixed axles at the rear of a truck or trailer and the second is the lack of maneuverability in close quarters of lengthy trucks and particularly tractor trailer combinations whether dual axle or single axle. The proposed solutions for the two problems have, furthermore, followed related, but distinct paths. In the case of tire wear, scuffing and plowing, the proposed solution, other than keeping dual or multiple axles as close together as possible, has been to turn at least one set of wheels in the natural direction of movement to facilitate rotation of the wheels of their axles rather than dragging of such wheel over the road surface. In the case of the problem encountered in turning or maneuvering a large truck in a small space, on the other hand, the usual solution suggested, other than the provision of auxiliary wheels for movement at angles to the natural rotation of the regular wheels, has been to turn the rear axles in the opposite direction from the front or steering wheels to facilitate more accurate tracking of the rear of the truck after or in the path of the forward portion.

A further difficulty with tandem or multiple axle truck arrangements is unequal distribution of weight between the axles during operation. If the weight of the vehicle is not equally supported by the tandem axles, particuarly on rough ground or road surfaces, there is always a danger of structural failure or instability of the vehicle to such an extent as to possibly even tip over such vehicle. Various arrangements for equalization of load have been used in the past including metal compression springs, air springs, rubber springs, various equalizing levers, and other arrangements. One fairly successful arrangement frequently used on modern trucks is a pneumatic suspension arrangement which may be either manually or automatically adjusted and leveled so that all axles carry substantially equal weights to prevent damage to the truck structure and/or instability of the truck during operation. Such arrangements have not, however, solved the problems of steering the rear of a truck in close quarters. The Humes U.S. Pat. No. 3,533,644, noted above, discloses such a suspension system. Sometimes trucks have used such pneumatic suspension systems to actually lift one set or one axle of truck wheels entirely from the road surface. U.S. Pat. No. 3,285,621 issued Nov. 16, 1966 to Turner can be mentioned as an example of such an arrangement. In the Turner patent, auxiliary wheel axles may be forced downwardly into contact with the road surface by a pneumatic suspension arrangement when a heavy load is carried, but may be raised by appropriate means when a light load is carried to decrease tire wear and scuffing when the truck rounds corners.

There has been a need, therefore, for a steering arrangement for the rear of the trailer of a tractor trailer combination which would allow such trailer to be easily maneuvered in close quarters and about sharp turns. In order to be practical, such steering arrangement should be simple to operate, foolproof, and easily and cheaply mounted upon the trailer of a tractor trailer combination. Furthermore, since many trucks are owned by small operators, it is desirable that any such rear trailer steering arrangement be mountable upon the truck structure by the owner of the truck or by fairly small truck servicing organizations as well as being incorporable into the trucks' structure during manufacture of new trucks. In other words, it is very highly desirable that any such steering arrangement be retrofitable into trucks already upon the highway with a minimum of mechanical modifications as well as being easily incorporated into the design of trucks yet to be built. It is, furthermore, highly desirable that such steering arrangement eliminate, as much as possible, undesirable scuffing and tire wear during use to steer the truck in close quarters.

OBJECTS OF THE INVENTION

It is an object of the invention, therefore, to provide a simple and practical steering arrangement for the rear axles of a tractor trailer combination.

It is a further object of the present invention to provide a method of steering the rear of a tractor trailer or other truck in close quarters which is both practical and easily implemented by a single driver.

It is a still further object of the invention to provide a steering arrangement for the rear axles of a truck including an elevating mechanism for the rear of the truck whereby the weight of such truck may be relieved from the axle being turned or pivoted during the actual axle turning process.

It is a still further object of the invention to provide a steering means for one or more rear axles of a truck including a pneumatic elevation means for relieving the pressure upon the axle and wheels which are to be steered prior to and during movement of such wheels into the steering position.

It is a still further object of the invention to provide a sturdy, practical pivoting arrangement for a dual axle of the rear of a truck comprising a forward pivot construction and a rear dual arcuate bearing beam construction.

It is a still further object of the invention to provide a forward pivot construction on a steerable wheel assembly formed from a plurality of superimposed relatively rotatable plates providing a simple, durable and sturdy pivot arrangement.

It is a still further object of the invention to provide a practical steering assembly for the rear wheels of a tractor trailer combination which may be supplied in kit-form.

It is a still further object of the invention to provide a steering mechanism for the rear axles of a tractor trailer combination which may be easily and simply operated by the truck operator for close quarters maneuvering of said truck and will be locked out of operation for highway travel.

It is a still further object of the invention to provide a steering mechanism for the rear axles of a tractor trailer combination which serves not only as a steering mechanism, but also as a suspension for the vehicle.

It is a still further object of the invention to provide a steering arrangement for the rear axles of a tractor trailer combination which may be easily and conveniently mounted upon a trailer by a skilled mechanic or by the truck owners themselves.

It is a still further object of the invention to provide a steering arrangement for the rear axles of a trailer or truck that because of its construction will be subject to minimum stress, not only during actual turning, but also during highway operation.

Other objects and advantages of the invention will become evident from a study of the following description and appended drawings.

BRIEF DESCRIPTION OF THE INVENTION

The present invention provides a method and means for steering the rear of a tractor trailer combination to facilitate maneuvering in close quarters by means of a steering apparatus comprising a fluid pressure suspension system which operates to remove the load of the truck from one axle while said axle is turned, preferably by fluid pressure means, and locked into place after which the weight of the truck is reapplied to the axle now in a turned position and removed from any adjacent unturned tandem axle. The truck is then moved with the rear axle in the turned position. Such movement is at a slow speed so that no detrimental effects arise from support or major support upon the single axle during such movement. After the movement has been completed, the weight may again be removed from the turned axle and such axle returned to its straightforward position, after which the weight of the truck is again returned to such axle along with any adjacent axle. If desired, both axles may be arranged to turn consecutively so that the truck may turn with the wheels of two axles in contact with the road surface. The pivoting point of the axle assembly is preferably positioned forward of the rotatable axle on the wheel assembly so that the wheel assembly will be automatically urged to a central position during highway travel thus minimizing stress on the assembly during use.

Apparatus for the steering mechanism of the invention comprises fluid-type and preferably pneumatic-type suspension means for at least one of the axles and preferably both for removing at least some of the weight of the truck body and any cargo load from an axle. The axle is mounted upon a turning plate or the like which allows it to turn to some predetermined or desired degree. As indicated, it is preferable for the pivot point of the turning assembly to be positioned forward of the position of the transverse axle. Control means are provided for implementing both the operation of the differential suspension means and the steering means.

In some arrangements, in accordance with the invention, there may be a further provision for movement of adjacent tandem axles apart to allow for additional clearance between the wheels on such axles in order to facilitate an additional turning radius of the axle. In such arrangements, the axles are then returned to their close spacing for highway travel in order to prevent deleterious scuffing of one or the other sets of wheels on curves.

The heart of the system of the invention is an air axle or similar suspension which allows the rear axle/wheel assembly to be raised off the ground in order to facilitate the movement of the steering assembly in the direction of the desired turn, or more particularly, in the direction in which it is desired to have the rear of the trailer move, since this can vary with the particular circumstances. The system of the invention is designed to be engaged only when the vehicle has been brought to a full stop in order to facilitate a turn and then must be returned to the normal driving position before use upon open highway. The system of the invention is not designed for full-time rear wheel steering at highway speeds and is thus intended to alleviate the difficulties in close-quarter steering, but not to alleviate difficulties which may be had in tire scuffing and the like due to fixed tandem axles on a tractor trailer assembly. As such, the invention addresses the principle difficulty which is had by the trucking industry with the fixed axle system for tractor trailers.

In operation, in accordance with the invention, the driver of a tractor trailer combination brings the vehicle to a full stop. Using an instrument and control panel or the like in the truck cab or other location, the driver then releases air from, or other wise deactivates, the rear axle suspension system of one axle, thereby raising one set of rear wheels off the ground and relieving the weight of the truck from such wheels and axle. The adjacent axle is now completely supporting the weight of the truck plus any load thereupon. The driver then selects the desired hydraulic switch or other control which will activate a two-way double acting hydraulic cylinder or other power means to apply force against the rear wheel steering assembly in the direction it is desired to change the orientation of the rear axle. After the steering assembly is turned the desired amount and locked, air is readmitted into the rear air/axle suspension system causing the wheels, which have now been turned a desired degree, to return firmly to the ground, once again supporting the weight of the truck and its cargo, if any. Air is now released from the air/axle suspension system of the adjacent dual axle which raises the wheels of the adjacent axle and eliminates the ground friction they would create in making the required turn. The driver of the truck then proceeds at slow speed to make the desired turn or other maneuver with the one dual axle turned. After completing such turn, the vehicle is brought to a stop and the driver repeats the above procedure in reverse order, removing the auxiliary steering wheels from the road surface while supporting the load upon the other axle, turning the rear wheel steering assembly to the normal driving position and then returning the steering assembly to load supporting position and distributing the load between the two dual rear axles. The steering mechanism is locked securely before resuming highway travel. While it is preferable to actually lift the wheel assembly from the road surface during turning, it will frequently be satisfactory and more economical to merely deplete the air from the appropriate wheel assembly suspension system so that the weight of the truck and any load is removed from such assembly and supported substantially solely upon the adjoining wheel assembly with only the weight of the air-depleted wheel assembly itself remaining upon the axle and wheels of the air-depleted assembly. It is frequently desirably not only to deplete the air from the one air bag assembly, but to increase the pressure in the air bag units on the adjacent dual wheel assembly at the same time to compensate for the depletion.

BRIEF DESCRIPTION OF THE DRAWINGS

FIG. 1 is an elevation partially broken away of a tractor trailer rig having a fluid-type suspension and a steerable axle assembly for practicing the present invention.

FIG. 2 is a bottom view of the trailer portion of the tractor trailer rig shown in FIG. 1.

FIG. 3 is a bottom view similar to FIG. 2, but showing the steerable axle and wheels turned in accordance with the invention.

FIG. 3a shows the steering assembly shown in FIGS. 2 and 3 in enlarged partial detail.

DESCRIPTION OF THE PREFERRED EMBODIMENTS

Figure 4:
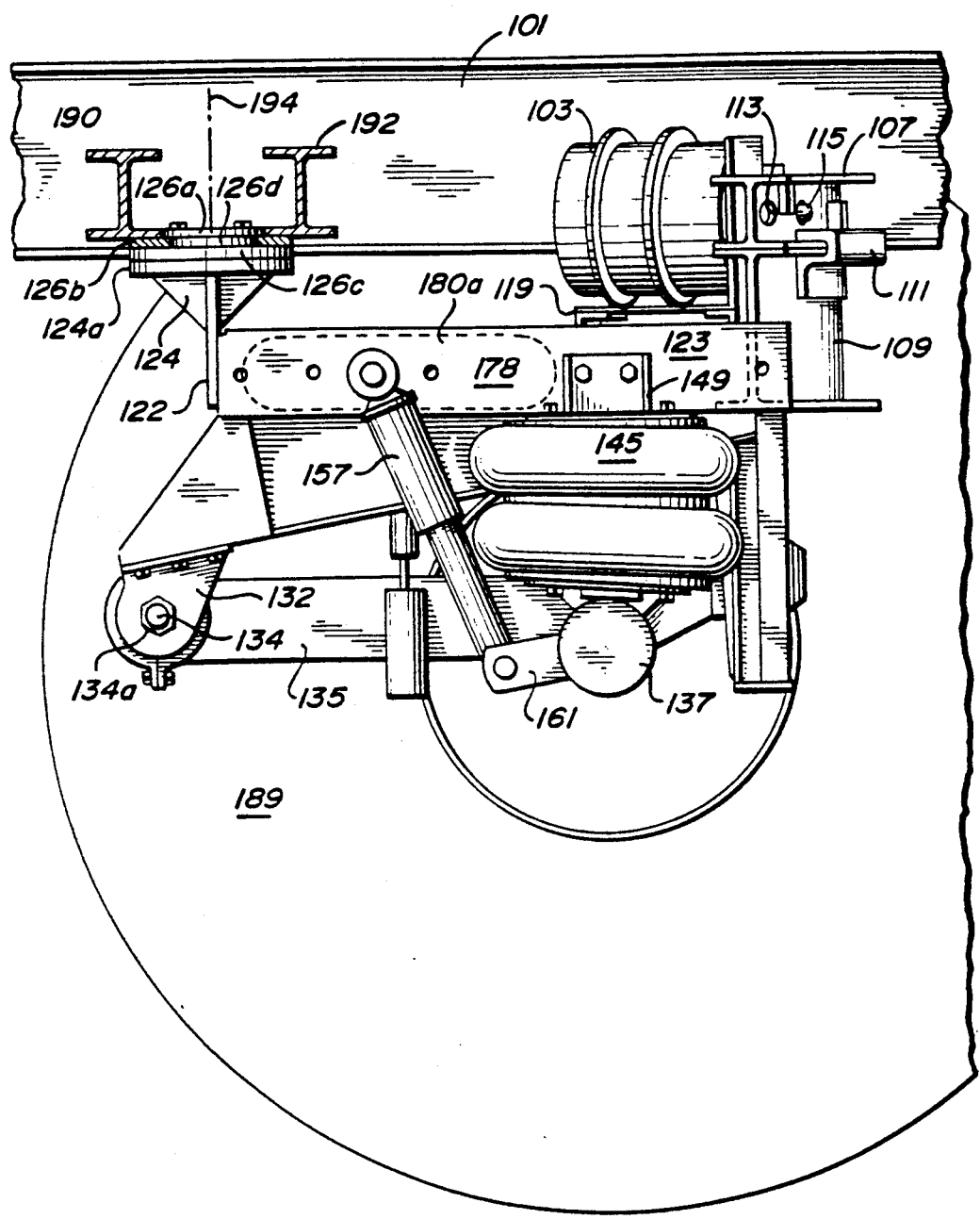
FIG. 4 is an enlarged, partially broken away side elevation of the steerable wheel assembly of the invention.

The present inventor has discovered that a very effective and economical arrangement for providing auxiliary steering at the rear of the trailer in a tractor trailer assembly, or indeed the rear of any long truck assembly, can be provided by combining a means for turning or pivoting one of the axles of a dual or multiple axle wheel assembly together with the use of a vertical movement facilitating means, preferably fluid suspension-type, or other similar means on at least one of the dual axle assemblies. When it is desired to steer the rear of the truck or trailer in close quarters, the tractor trailer is stopped and by suitable control means in the cab or elsewhere on the truck, the driver will relieve or lift the weight of the truck from the axle provided with a pivoting steering means. While the weight of the truck and its cargo is substantially removed from the pivotable or turnable axle, the turning mechanism is operated so the axle is pivoted laterally about its pivot point, moving the axle preferably by predetermined amounts to a position in which it will effect a sideways component of movement of the rear of the trailer when the trailer is moved as a whole. Any movement of the the trailer initiated by the traction wheels is thus effected, not only longitudinally of the trailer, but also laterally or at cross-angles with respect to the longitudinal axis of the trailer so that such trailer is more easily guided either about a corner or into a parking space into which it would be otherwise very difficult, or, in many cases, impossible to propell it. Once the axle in question is turned to the desired degree to effect necessary movement of the rear of the trailer in a direction which will effectively aid in moving the trailer into a desired position, the fluid suspension means is activated to return the weight of the truck and its cargo to the rotated axle. At the same time, or immediately thereafter, the weight is removed from the adjacent axle and preferably said axle is lifted from the ground. The truck can then be moved with the rear axle turned and supporting both the rear of the trailer and the load in the trailer until a position is reached at low speed at which it is desired to return the truck to over the highway operating condition. At this point, the truck is again stopped and the load of the truck and its cargo is removed from the turned axle by either extending the adjacent axle until it supports most of the weight of the truck or by retracting the turned axle until it lifts from the road surface. At this point, when the major and preferably all the load is removed from the turned axle, said axle is returned to its original right angle position with respect to the longitudinal axis of the truck. The fluid suspension of the truck or trailer is then adjusted until the load is equally divided between the two axles at which point the truck is again ready for general highway use.

The assembly of the invention is both simple and practical and may be mounted upon the truck by small repair shops or even by the truck owner himself. Since the air of the suspension system is depleted while the rear axle is turned in order to remove the weight of the truck from the wheels, it is necessary only to have a relatively light mechanism to turn the wheels. The axle and wheels can be turned to any desired extent within the limits of the clearance between the wheels of the turned or pivoted axle and the wheels of the adjacent axle or axles or of the wheels with the structural members of the trailer. The pivoting of the axle and wheels enable specialized steering of the rear of the truck in conditions in which it would not otherwise be steerable. Turning of the wheels, moreover, may be used to relieve scuffing from the tires while the truck is making sharp turns at low speed or for other purposes.

Essentially the invention can be used for all types of commercial vehicles having dual axle rear wheel assemblies including straight trucks from thirty to forty feet in length, trailers from thirty to sixty feet, and multiple trailers with four axles and special service trailers. Other commercial vehicles such as buses and the like can also be operated with the apparatus and method of the invention.

The heart of the rear wheel steering system of the invention is preferably an air or pneumatic axle suspension which allows the rear axle/wheels assembly to be raised off the ground or to have the weight of the truck substantially relieved from the wheels by partial lifting in order to facilitate movement of the steering assembly in the direction of the desired turn. While a pneumatic axle suspension is preferred, other mechanical arrangements for relieving the weight from the wheels can be used. In the preferred form of the invention in which the pivot point of the turning assembly is positioned forward or ahead of the pivotable axle assembly respective to the normal movement of the truck or other vehicle, the relief of the major load from the pivoted wheel assembly not only renders turning of the assembly feasible with relatively light rotation apparatus, but is the effective means for enabling pivoting of the rotatable wheel assembly at all.

In FIG. 1 there is shown a diagrammatic representation of a tractor trailer or multiunit truck 11 comprised of a tractor 13 and a trailer 15. The tractor has front wheels 17 which it will be understood are the usual steerable wheels mounted on kingpins, not shown. Tractor 13 also has rear wheels 19 which it will be understood are drive wheels driven through a drive shaft and transmission gear arrangement not shown. Some modern trucks may incorporate a front wheel drive.

The various wheels of the tractor trailer combination shown in FIG. 1 are, except for the front wheels of the tractor, shown partially broken away so that only the wheels on the far side of the truck are seen in order that intermediate structures such as the frame or wheel base 21 of the truck 11 can be better depicted. In other words, only the wheel and tire combinations on the far side of the truck as viewed in FIG. 1 are shown, the wheels and tire combinations on the near side having been removed or broken away for additional clarity. At the rear of the tractor and forward portion of the trailer is a so-called fifth wheel arrangement 23 through which the trailer 15 is pivotally secured to the tractor 13.

The trailer 15 is shown constructed of a frame 25 comprising longitudinal I-beams 27, frequently referred to as the chassis rails, and lateral or transverse I-beams 29, frequently referred to as cross member supports crosswise of the longitudinal beams, upon which cross beams 29 is supported a body section 31, which, as shown, may comprise a conventional closed trailer body section.

Two transverse axle assemblies 33 and 35 are secured at the rear of the trailer 15 to the longitudinal structural I-beam 27. Each rear wheel assembly is provided with a suspension jacking means 36 shown diagrammatically in FIG. 1 as comprising a top longitudinal support beam 37 which is attached by a dependent bracket 39 to a lower pivot beam 41 pivoted to the dependent bracket 39 by a pivot pin 43. Between the longitudinal support beam 37 and the longitudinal pivot beam 41 and spaced from the dependent bracket 39 is located a conventional air bag-type pneumatic suspension unit 45. The basic parts comprising the longitudinal support beam 37, the dependent bracket 39, the longitudinal pivot beam 41, the pivot pin 43 and the air bag suspension units 45 each comprise as a whole, a pneumatic suspension and jacking means 47 through which the weight of the trailer, as well as the load in the trailer, may be supported and through which the entire axle assembly may be either urged into contact with the road surface beneath the tires or may be relieved from the road surface by depletion of air in the suspension air bags 45, providing an alternative support for the weight of the trailer is present. Such alternative support, of course, is the adjacent wheel assembly which will be pressed firmly into contact with the road surface.

The forwardmost or front dual rear wheel assembly 33 is directly mounted to the longitudinal beam 27 by welded brackets 49. The front axle assembly 33, therefore, is not adjustable for steering of the tractor trailer unit. The rear axle assembly 35 of the dual axle assembly is, however, mounted upon a platform or plate 51 pivoted via the pivot 53 to a stationary support plate 55 welded or otherwise rigidly secured across the frame beams 27 of the trailer 15. The contacting surfaces of the plates 51 and 55 can, if desired, be coated with polytetrafluoroethylene or "Teflon" to reduce friction.

In FIG. 1, the left side longitudinal support beam 37, dependant bracket 39, lower pivot beam 41 and air bag suspension unit 45 have been removed from the rear pivoting transverse axle assembly 35 for better visibility of the interior structures and only the right side bracket 39 and lower pivot beam 41 are visible. It will be understood, however, that the entire pneumatic suspension and jacking means 47 is the same on both dual axles, the only difference being that the longitudinal support beams 37, in the stationary assembly, are mounted upon the brackets 49 while in the pivoted assembly they are welded directly to the rotatable or pivoted plate 51.

A fluid cylinder 57 is attached to the truck frame 25 via bracket 59 and has a piston rod 61 pivotally secured to the pivoted plate or platform 51. This is clearly visible in FIG. 1 because of the removal of the left side bracket 39. At the rear of the pivoted platform or plate 51 is a downwardly extending arcuate interlock plate 61. Adjacent to the downwardly extending arcuate interlock plate 61 is a corresponding arcuate interlock plate 63 rigidly mounted upon the rear end of the stationary support plate 55. The stationary interlock plate 63, as seen in FIGS. 2 and 3, and as partially shown in an enlarged view in FIG. 3a, is shorter than the movable interlock plate so that as the pivoted platform plate 51 rotates on its pivot 53, the arcuate movable interlock plate 61 slides along the rigid interlock plate 63 which is sufficiently laterally abbreviated that it does not interfere with the movement of the axles and wheels of the rotatable axle assembly designated generally as 35.

Also mounted upon the pivoted platform plate 51 are two fluid-type cylinder assemblies 65 which are each provided with a piston rod 67 formed at the end into a locking pin 69 which, upon extension of the piston rod 67, passes through openings in the arcuate movable interlock plate 61 and stationary interlock plate 63 to, in effect, lock such plates together and at the same time lock the pivoted platform plate 51 in position. Locking the two interlock plates together effectively locks the movable wheel assembly 35 in whatever position it happens to be. It will be understood that since there are only a finite number of locking orifices in the stationary and movable interlock plates, there will be a finite number of positions in which the movable wheel assembly may be positioned. These, however, will be sufficient to provide for effective positioning of the movable wheel assembly for steering in whatever direction is desired or decided by the truck operator. Usually only a relatively few positions will be necessary. The relationship of the two interlock plates 61 and 63 in both a straight ahead and turned position can be seen in FIGS. 2 and 3 where the movable wheel assembly 35 is in a straight ahead position in FIG. 2 and the movable wheel assembly 35 is in a turned position in FIG. 3.

Also shown in FIGS. 1 and 2, is a control cable 73 which passes from the cab of the tractor 13 of the tractor trailer assembly 11 back between the tractor and the trailer and extends below the floor of the trailer through the transverse I-beams 29 into the vicinity of the rear wheel assemblies 33 and 35 where the control cable 73 deadheads in a junction box 75. Separate control lines 76 extend from the junction box 75 to the two air bag suspension units 45 on each wheel assembly as well as the hydraulic motor and pump 77, which provides fluid pressure to the fluid cylinder 57, and to the hydraulic motor 79 which provides fluid pressure for the fluid-type cylinders 65 which control the movement of the locking pins 69. The forward end of the control cable 73 passes into the cab of the truck and is connected to several control means mounted on the inside side wall or roof of the truck cab. These controls are shown in FIG. 1 enlarged and mounted on a control panel 81. An auxiliary steering control 83 in the form of a dual push-button control having push-buttons 83a and 83b as shown serves to operate the hydraulic motor 77 for the double acting hydraulic fluid cylinder 57. When the wheels are turned to either the right or to the left, the light 83c is lighted. Control 85, L which is shown in the form of toggle switch control 85a, controls the admission and exhaust of pneumatic pressure to and from the forward air bag suspension units 45a and 45b and control 87, which is also shown in the form of a toggle switch 87a on the control panel 81 unit in the cab of the truck, serves to control admission and exhaust of pneumatic pressure from the rear air bag suspension units 45c and 45d. Light 85b is lighted when the air bags 45a and 45b are activated and light 87b is lighted when air bags 45c and 45d are activated. Control 89, which is also shown in the form of a toggle switch control units 89a and 89b, serves to operate the double acting fluid cylinders 65 which move the locking pins 69 into and out of locking position. Each toggle switch operates one fluid cylinder assembly 65 as a safety precaution. Lights 89c and 89d indicate whether each locking pin is activated or not. A position gauge, not shown, also may be provided in the cab of the truck attached to the control 81 for the hydraulic motor which operates the double acting fluid cylinder 57. The position gauge will indicate to the driver the precise angle at which the pivoted plate 51 of the rear wheel assembly and the rear dual wheels are turned.

The steering apparatus shown in FIGS. 1 through 3 and partially in FIG. 3a operates as follows. When the truck has reached a position at which the driver wishes to make use of the rear steerability of the trailer, due to constricted traffic or road conditions, he will stop the entire tractor trailer 11. After stopping the tractor trailer, the driver will, by operation of the control 87a, increase the pressure within the air bag suspension unit 45a and 45b which comprise the principal operative portions of the pneumatic suspension and jacking means 47a so that the air bag suspension units 45a and 45b are extended and the front wheel assembly 33 is sufficiently activated to support the major portion of the weight of the trailer 15. Since the trailer is not moving, there will be no danger in adjusting the suspension system so that all the weight is taken upon only the one rear axle. An elevated pressure will be provided in the air bags 45a and 45b which is greater than normal, perhaps 120 lbs./in.$^2$ rather than 80 lbs./in.$^2$. Preferably the air bag suspension units 45a and 45b, or pneumatic suspension and jacking means 47a, are extended sufficiently so that the rear wheel assembly 35 is removed completely from the ground or road surface. Such removal may be aided by deactivating or depleting the air from air bag suspension units 45c and 45d, which may be collectively referred to as pneumatic suspension and jacking means 47b, in the rear wheel assembly 35 to release pressure from the air bag suspension units or means. Additional resilient means or other means may be provided to actively lift the rear wheel assembly 35 from the road surface. For example, simple coil spring means working in opposition to the air bag jacking means 47a or 47b on both wheel assemblies could be provided to actively raise the wheel assemblies when the air bag means are deactivated. Alternatively, the pivot pin 43 could be replaced by a torque rod arranged to lift the wheel assembly. Such expedients have the disadvantage that the resilient means normally acts against the air bag suspension means. However, a positive or active elevation device such as a pneumatic or hydraulic cylinder may be used to elevate the wheel assembly. Assuming that a torque rod 43a is used to replace the pivot pin 43, the torque rod 43a in such suspension will tend to lift the entire axle assembly upwardly thus aiding in lifting the entire assembly from the ground or road surface. The driver will next, by operation of control 89, operate the fluid cylinders 65 to remove the locking pins 69 from the interlock plates 63 and 65 to free the rotatable wheel assembly 35 for turning. Alternatively, the control 89 may be operated together with control 87 for simultaneous lifting and unlocking of the rotatable wheel assembly 35. When the rear wheel assembly 35 is removed completely from the road or alternatively, when most of the weight of the trailer and its load are removed from the rear wheel assembly, such assembly may be turned to any desired degree by the driver operating the control 83. When the desired degree of turning or lateral rotation of the pivoted platform 51 is attained as shown by the position gauge, visual observation of the actual wheel assembly or other expedient, the control 89 may again be operated to lock the attained or desired degree of turn of the wheels on the rotatable assembly 35 by the operation of the fluid cylinders 65 which operate to move the locking pins 69 to interlock the movable interlock plate 61 with the stationary interlock plate 63. When the two interlock plates are effectively locked together by operation of the locking pins 69, the control 87 for the rear air bag suspension units 45c and 45d, which comprise the operative portions of the suspension and jacking means 47b, is operated to apply pressure to the air bag units and urge the rear wheel assembly 35 into contact with the road surface. After secure contact of the rear wheel assembly 35 with the road surface is attained, the control 87 may be operated to remove or deplete pressure from the air bag suspension units 45a and 45b, or jacking means 47b, whereupon the torque rod 43a in the forward rear wheel suspension will lift such forward suspension from the road surface. Alternatively, the control 85 for the forward air bag units may be effectively operated simultaneously with the rear air bag suspension to lift the forward wheel assembly 33 from the road surface by operation of the applicable torque rod 43a or by some other suitable lifting device. The truck may then be moved with the rear wheel assembly turned at the desired angle. If the slow movement of the truck appears not to be correct for the movement of the trailer body which is desired, the truck may again be halted and adjustments made in the angle of steering of the rear wheel assembly. The same sequence of operations will be gone through each time a correction is made in order to move the rear wheel assembly 35 into the correct or desired path or position. It will be understood that the truck will be moved at only a slow speed while the wheels are turned and while the weight of the truck is supported only upon the turned wheels. This will prevent any damage to the truck structure or to the road surface or pavement due to the more concentrated weight upon such road surface and pavement. As is well known, weight applied slowly to a road surface is not as damaging as the same weight applied suddenly at an accelerated speed. After the truck has negotiated the restricted parking or traffic conditions, the reverse sequence of operations will return the truck to road or highway condition in which the weight is equally distributed across both rear axles.

It will be recognized that by the sequence of operations explained above, a very effective method of steering a truck with relatively light steering apparatus is provided and that such steering can be effected in a very satisfactory and safe manner. The fact that only fairly light apparatus or mechanical devices are required to support and steer the trailer unit makes it feasible for already existing trucks to be easily retrofitted with the steering apparatus of the invention using largely already available apparatus. The combination of the invention, therefore, is very effective and satisfactory as an auxiliary steering method and apparatus.

It will be noted that in FIGS. 1 through 3, the pivot 53 of the movable or rotatable plate 51 is positioned forward of the axle of the pivoted assembly 35 so the center of retarding force is behind the pivot point. Such arrangement renders the wheel assembly self-straightening during highway travel forward at elevated speed and thus not only constitutes a fail-safe arrangement, but decreases stress upon the steering and locking mechanism at elevated highway speeds. The release of the weight of the truck from the steerable wheel assembly during pivoting of said assembly not only decreases the stress on the assembly during steering, but in the preferred assembly, enables pivoting of the wheel assembly without undue stress upon the assembly and the steering power means.

Figure 5:
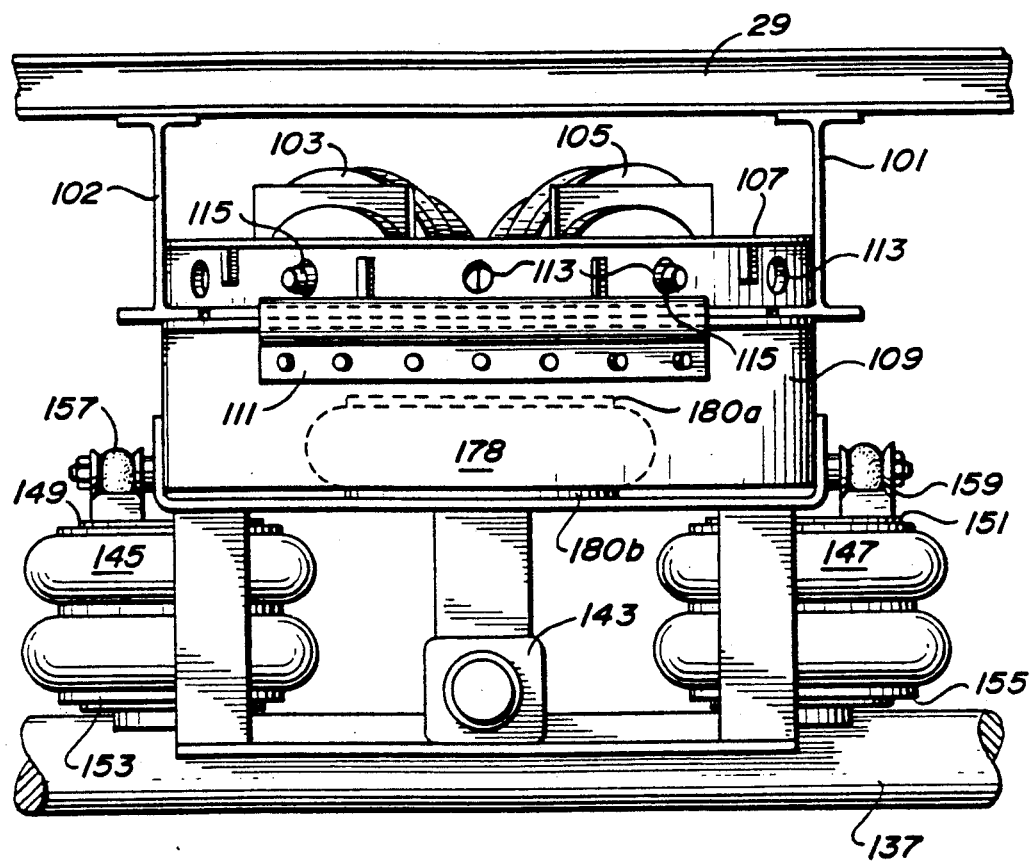
FIG. 5 is an end elevation of the portion of the steerable assembly shown in FIG. 4.
Figure 6:
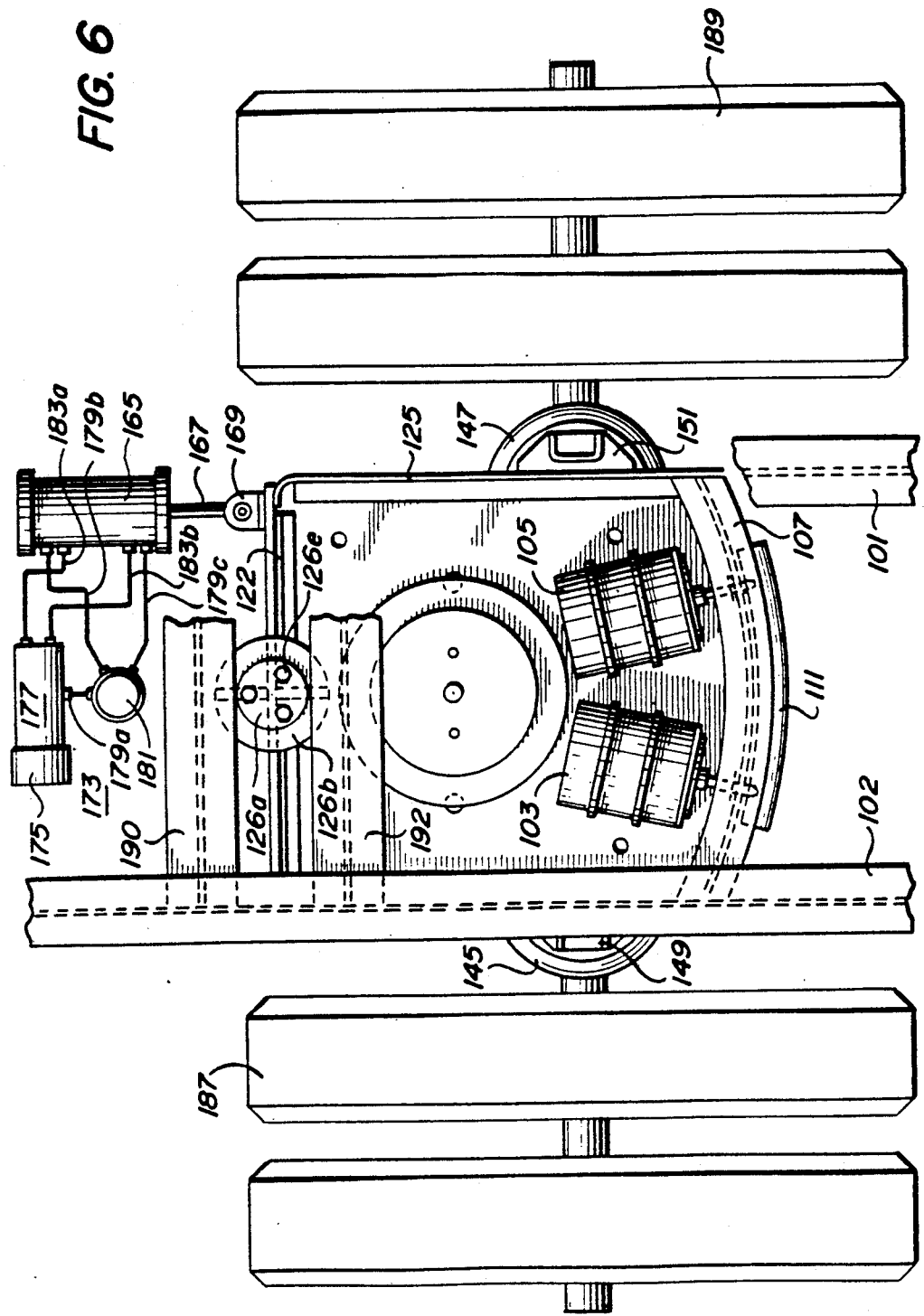
FIG. 6 is a top view of the steerable axle assembly shown in FIGS. 4 and 5.
Figure 7:
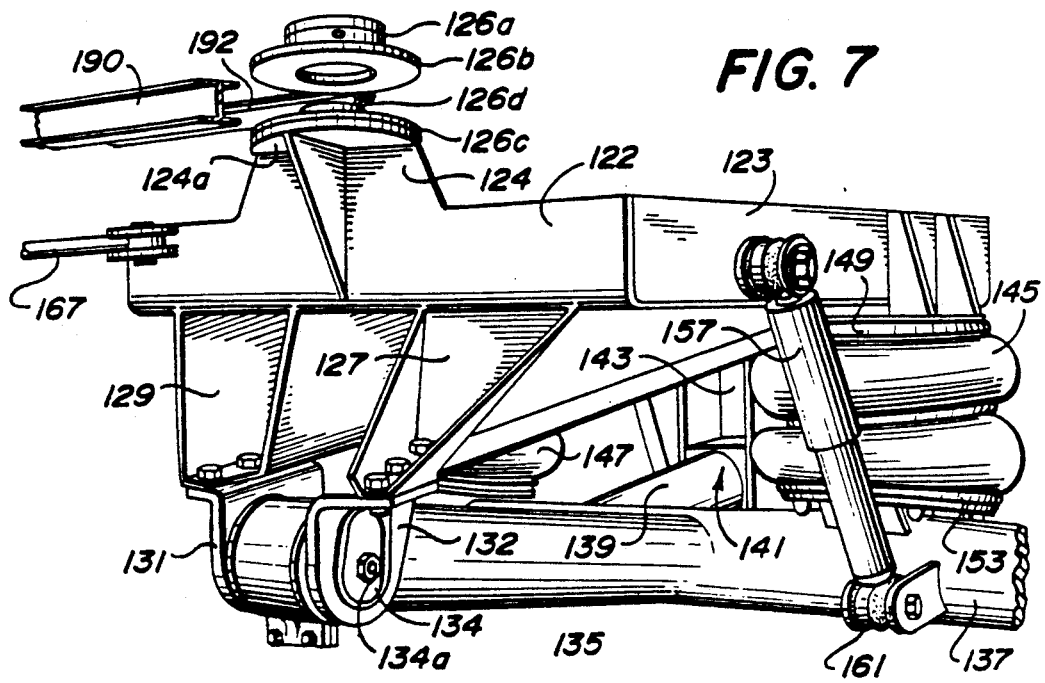
FIG. 7 is an isometric oblique view of the steerable wheel assembly shown in FIGS. 4 through 6.

FIG. 4 shows an enlarged side elevation of one particularly desirable and preferred embodiment of apparatus for practicing the invention. A rear view of the apparatus shown in FIG. 4 is also shown in FIG. 5 and a top view of such apparatus is shown in FIG. 6. An isometric view is also shown in FIG. 7 for additional clarity. In FIGS. 4, 5, 6 and 7, it will be understood that many of the same structures are shown as are shown in FIGS. 1, 2 and 3. However, since there are variations, which could be otherwise confusing, a new set of reference numerals is largely used in FIGS. 4, 5, 6 and 7 for convenience and clarity.

In FIG. 4, there is shown a longitudinal beam, or so-called chassis rail 101, which, it will be recognized, is similar to the longitudinal structural beams 27 in FIGS. 1 to 3. The structural beam 101 shown is the beam on the right side of the truck. It will be understood that the transverse beams, frequently referred to as cross member supports, 29 of the trailer frame, which are not shown in FIG. 4, pass transversely across the top of the longitudinal beams 101 and 102 as shown in FIG. 5. These are the same as the same cross member supports 29 shown in FIGS. 1 to 3.

An arcuate interlock beam 107 generally similar in function to the interlock plate 63 in FIGS. 1 to 3 is rigidly secured, preferably by welding, between the longitudinal beams, or chassis rails, with the lower surface of the flange of the beam 107 at the same or substantially the same elevation as the lower surface of the lower flange of the two longitudinal beams 101 and 102. A second arcuate curved beam 109, having substantially the same radius of curvature, is positioned below the upper arcuate beam with the upper flange of such arcuate beam 109 adjacent to the lower flange of the upper arcuate beam. As shown in FIG. 5, the length of the two arcuate beams 107 and 109 is substantially the same. The second, or lower arcuate beam 109 is, as best shown in FIGS. 4 and 6, attached to the rear of a rotatable wheel box-type assembly 110 comprised of a rotatable base plate 121, best seen in FIG. 6, with reinforcing side plates or brackets 123 and 125. The arcuate beam 109 is welded to the corners of the side plates 123 and 125. The two arcuate beams 107 and 109 are maintained adjacent each other in a sliding relationship by a U-shaped clamp or latch 111 which extends over the adjacent flanges of the two beams. The U-shaped clamp or latch is attached to the arcuate beam 109 by fastenings 112. The latch 111 allows the two arcuate beams to slide past each other as the pivoted plate 121 pivots on the axis 194 shown in dotted lines in FIG. 4. It may, in some instances, be desirable to position the bottom of the lower flange of the arcuate beam 107 slightly above the lower surface of the lower flange of the longitudinal beams 101 and 102 so that in the straightened highway position of the pivoted plate 121, the lower arcuate beam 109 bears on both sides directly against the longitudinal beams, or chassie rails, 101 and 102. In such case, the lower arcuate beam continues, as the pivoted plate 121 pivots, to bear upon at least one of the longitudinal beams and at its central or inner end against the lower surface of the upper arcuate beam 107. The arrangement shown in FIG. 5 with the two surfaces level, provides a somewhat smoother operation and is somewhat more desirable if the auxiliary turning apparatus is likely to be subjected to heavy use.

In the turning apparatus as described, the orifices 113 in the upper arcuate interlock beam provide seating for the pins 115 which are driven home by air release spring safety cylinders 103 and 105. Since the cylinders 103 and 105 are mounted fixedly to the pivoted plate 121 and the arcuate beam 107 is fixedly secured to the frame of the truck, namely to the longitudinal beams or chassis rails 101 and 102 driving home the pins effectively locks the pivoted plate and the entire wheel assembly to the truck frame. This is equivalent to locking the two interlock plates shown in FIG. 1 through 3 together. The lower arcuate beam on the other hand, being fixed to the pivoting plate at the rear provides a bearing surface at the rear upon which the pivoted plate can turn. This, together with the rotating pivot arrangement at the forward portion of the pivoted plate, provides an effective bearing for such rotation.

Since the longitudinal beams 101 and 102 of most trucks are spaced from each other a fairly uniform width to allow for the attachment of standardized wheel trucks, it is possible to use a fairly standardized length of arcuate interlock beam extending completely between and welded directly to the longitudinal beams 101 and 102 on a large number of trucks and, where possible, this is a preferred arrangement which has the dual advantage of simplicity and sturdiness. However, other arrangements for attaching the top arcuate beam as well as the lower arcuate beam may be used.

As indicated, the stationary arcuate interlock plate or beam 107 is secured in any suitable manner between the longitudinal structural beams 101 and 102 as best shown in FIG. 5. Below the arcuate interlock beam 107, which may take the form of a curved I-beam type section, there is provided the second curved I-beam section 109 which provides the operative movable interlock and bearing plate. The upper interlock beam 107 has a series of orifices 113 extending through it which are designed to accept locking pins 115 mounted at the ends of the piston rods 117 of safety spring activated air release cylinders 103 and 105. These air release safety cylinders 103 and 105 are mounted upon brackets 119 which are secured to the pivoted plate 121 to which is attached a forward central bracket 124. The forward central bracket 124 has a top plate 124a and is attached to a front bracket or side 122 extending upwardly from the forward end of the pivoting plate 121. The top plate 124a is secured by welding or other suitable means to the bottom plate 126c of a pivot assembly 126. Additional details of this pivot arrangement may be found in FIGS. 7 and 14 and are described in connection therewith. Side brackets 123 and 125 are secured to the sides of the pivoted plate 121. See FIG. 6.

As shown best in FIG. 7, dependent U-type bracket means 127 and 129 are secured to the bottom of the pivoted plate 121 and have secured at the ends L-type brackets 131 and 132 through which passes a central pin 134 secured with a nut 134a. The pin 134 rotatably engages a pivoted structural arm 135. The structural arm 135 has a fairly substantial diameter in order to provide strength and is welded to or merges directly with the axle 137 passing at right angles across the end of the structural arm 135 and transversely to the longitudinal beams 101 of the trailer body. A further structural arm 139 extends from the rear of the axle and somewhat upwardly ending in a substantially rectangular section 141 which is contained within a vertically oriented box-type slide bearing 143. A pair of pneumatic air-bag-type suspension units 145 and 147 are mounted on bracket sections 149 and 151 which are secured dependently from the rotating or pivoted plate 121 through the side brackets 123 and 125 respectively mounted or extending upwardly therefrom. The lower ends of the air bag suspension units are supported upon brackets 153 and 155 which are mounted upon the axle 137 on either side of and spaced from the structural arms 135 and 139. It can be seen in FIG. 7 that the structural arm 139 is offset from the pivoted structural arm 135 along the axle 137. Such offset, however, is not necessary and would, in some cases, in fact, preferably not be present.

A shock absorber 157 is visible in FIGS. 4 and 7. This shock absorber is pivotally attached at the top to the side bracket 123 which extends upwardly from the pivoted plate 121 and at the bottom is attached pivotally to a bracket 161 welded to the axle 137. The pivoted arrangement of the shock absorber 157 to the side brackets 123 can also be seen in FIG. 5 together with a small portion of the top of the shock absorber 157 itself, the remainder of the shock absorber being hidden behind the air bag units 145. Likewise, the top of a comparable shock absorber 159 can be seen pivoted from bracket 125 on the other side of the rotating assembly in FIG. 5.

A fluid cylinder 165 is shown in FIG. 6 attached via its piston rod 167 to a bracket 169 secured to a side bracket 122 which is in turn secured by welding or other fastening means to the side brackets 123 and 125 as well as to the pivoted plate 121. An electric hydraulic pump assembly 173 comprised of an electric motor 175 and a pump 177 is attached through hydraulic lines to the fluid cylinder 165. Since the fluid cylinder 165 is a double-acting cylinder, the main hydraulic line 179a passes through a valve control 181 which has further hydraulic lines 179b and 179c leading to the forward and rear portions of the fluid cylinder 165. Return lines 183a and 183b lead back from the cylinder to the reservoir of the pump 177.

The safety spring activated air release cylinders 103 and 105 are supplied with operating air from any suitable source, not shown, usually the normal pneumatic system of the truck as are the air bags 145 and 147. A control system such as shown in FIGS. 1–3 may be used for control of these units. A third air bag 178 is shown in phantom in FIGS. 4 and 5. This air bag, when activated, works in opposition to the two air bags 145 and 147 and serves to actively lift the wheel assembly through force exerted upon the two brackets 180a and 180b which are attached to the structures of the suspension in a manner known in the art to force the suspension upwardly when the air bag 178 is activated and air is released from air bags 145 and 147.

It will be understood that the preferred embodiment of the steering unit shown in FIGS. 4 through 7 operates in essentially the same manner as the generalized version of the steering assembly shown in FIGS. 1 to 3. In other words, when it is wished to turn the rear steering assembly of a truck in order to steer the rear of the truck due to close quarters or other obstructions which it is desired to steer the trailer around rather than allowing the trailer to follow its normal path toward the fifth-wheel assembly securing the tractor and trailer together, the truck will first be stopped and a combination suspension and jacking system attached to the adjacent dual rear wheels will be operated to relieve the stress or weight of the truck and any load largely from the rotatable wheel assembly. When such pressure is sufficiently removed and, in some cases, when the dual wheels 187 and 189, shown in outline in FIG. 4 and substantially in full in FIG. 6, are lifted entirely from the ground or road surface, assuming that an additional lifting mechanism is used, such as a torque rod 43a or other lifting means, the hydraulic or fluid cylinder 165 is then activated by operation of the pump 177 and the valve 181 to turn the pivoted plate 121 with the attached structures to the position in which it is wished to bring the dual wheels 187 and 189, for example, as shown in FIG. 3 for a somewhat different apparatus arrangement. After this, the pressure in the air bag suspension system on the adjacent suspension for the adjacent dual wheel assembly is relieved so that the weight of the truck and tractor trailer are again returned to the dual wheels 187 and 189. The adjoining dual axle wheels on the truck will then be lifted, preferably entirely from the road surface so sufficient weight will be relieved from them to allow the turned wheels to efficiently direct the rear of the trailer in the direction in which the wheels are turned as the tractor applies forward or rear force to the trailer through the fifth-wheel assembly.

It will be understood that the raising and lowering of the steering wheel assembly may be a cooperative action between the two sets of suspension means and the two sets of dual rear wheels of the trailer. Alternatively, the air bag suspensions and any torque rod journaling of the pivoted structural arm 135 may be relied upon essentially to control the entire operation or maneuver. In other words, the adjacent dual wheel assembly could be a conventional spring assembly having the usual leaf-spring arrangement or even a coil spring-type arrangement. Assuming that the air bag suspension system has a sufficient range of movement, when it is desired to turn the rear steerable wheel assembly on the truck, the air bag suspension units 145 may be operated to relieve all downward force other than the weight of the wheel assembly itself from the axle 137, upon which a torque rod mounted in the end of the pivoted structural arm 135 will tend to lift the rotatable wheel assembly from the ground, assuming that the torque rod is sufficiently powerful. When the dual wheels 187 and 189 are lifted from the ground, or at least when substantially all the major weight of the truck and load is removed from such wheels, the cylinder 165 may be operated to turn the wheel assembly. When the wheel assembly has been turned the desired degree, the air bag suspension units 145 will be operated, usually through the normal pneumatic system of the truck, to urge the axle downwardly until it contacts the ground again. Rather than lifting the adjacent set of wheels from the road surface at this point, the air bag suspension units, if sufficiently powerful, may continue to be activated until they force the turned wheels into the ground with sufficent force to effectively raise the adjacent dual axle wheel set from the ground so that the rear of the trailer can be easily moved in the direction in which the wheels are turned when longitudinal force is applied to the trailer through the fifth-wheel assembly at the front of the trailer. It will be evident that it is well within the scope of the present invention to use a second set of air bags or even a single set arranged in the overall apparatus as shown in FIGS. 4 and 5, so the axle 137 is lifted by pneumatic pressure rather than by a torque rod at the end of the pivoted structural arm 135, which torque rod may, in many cases, not be sufficiently powerful, particularly after long use, to effectively lift the weight of the wheel assembly from the road surface.

When one air bag suspension assembly is relied upon to lift the adjacent dual wheel assembly either actively from the road surface, or passively relieve the weight therefrom, as for example, when the adjoining wheel assembly has a spring-type suspension, the air pressure in the air bag suspension may be raised, for example, from a normal or perhaps 80 pound per square inch to 120 pounds per square inch. Various combinations of active and passive lifting of the wheel assemblies may be used to control the relative distribution of the weight of the vehicle or truck and any load from one or both of the dual wheel assemblies.

Figure 14:
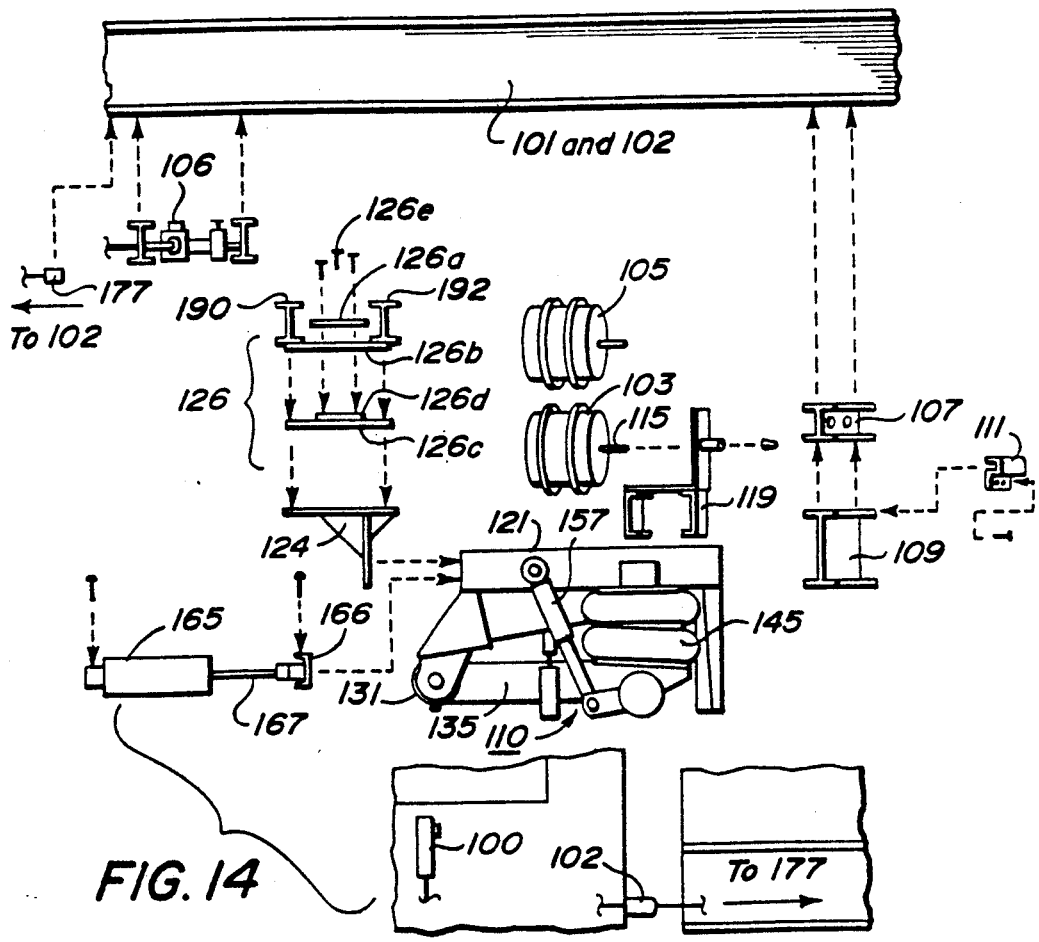
FIG. 14 shows a diagrammatically broken away, partially disassembled view of the various parts of the apparatus for practicing the invention as shown generally in FIGS. 4 through 7.

As will be evident from review of the FIGS. 4 through 7 and with particular reference to FIGS. 4 and 7, when the pivoted wheel assembly shown in such figures is turned, it pivots about the pivot point defined by the center of the set of pivot plates 126. As shown in FIGS. 4, 7 and 14, there are three (3) separate plates 126a, 126b and 126c with either a fourth plate 126d or an integral raised portion in the middle of the plate 126a. The plate 126a is a separate plate, as shown in FIG. 14, secured to the horizontal top portion 124a of the bracket 124 which is, in turn, secured to or integral with the side or end bracket 122 at the front of the pivoted plate 121. A second plate 126b is securely attached, preferably to the bottom by welding or the like of two adjacent transverse beams 190 and 192 that have been welded at their ends to the inside surfaces of the longitudinal beams or chassis rails 101 and 102 as shown in FIG. 5. The plate 126b has a central orifice extending through it large enough to accommodate the separate plate or raised portion 126d of the plate 126a so that when the various plates 126 are assembled together by bolts 126e, the plate or raised portion extends through the central orifice in the plate 126b and is flush with and secured to the plate 126c. As will readily be seen in FIGS. 4 and 7, the plate 126b remains stationary upon the transverse beams 190 and 192 extending between the two chassis rails 101 and 102 and the remainder of the wheel assembly apparatus, including the other plates, pivots about an axis, indicated in FIG. 4 by broken line 194, which passes directly through the center of the various plates 126. The arcuate beams 107 and 109 are concentric with the axis 194 so that as the entire assembly rotates about such axis, the lower arcuate beam 109 remains in line with the upper arcuate beam 107. The clamp or latch 111, which holds the bottom flange of the upper curved beam 107 and the upper flange of the lower curved beam 109 adjacent to each other, serves to prevent the lower arcuate beam from falling away from the upper beam if the pivoted wheel assembly is lifted completely off the road surface either during turning maneuvers or during highway travel when encountering bumps and the like. As will be evident from an inspection of the figures, the pivoted front of the wheel assembly is rotatably secured to the truck frame by the arrangement of the plates 126. Appropriate surfaces of the various plates 126 may be lubricated along with the abutting surfaces of the lower and upper flanges of the two arcuate beams 107 and 109. However, since the wheel assembly will normally be moved only infrequently, it is usually satisfactory to use them unlubricated, particularly since the weight of the truck and its cargo or load are relieved from the wheel assembly prior to the initiation of rotational movement.

Figure 8:
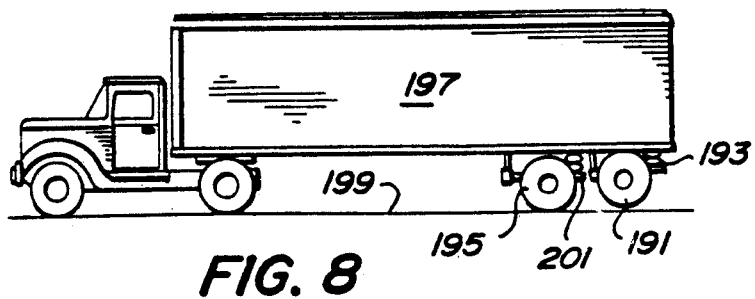
FIG. 8 is a diagrammatic side elevation of a tractor trailer combination equipped with the apparatus of the invention in which the fluid suspension has raised the rear set of wheels from the ground.
Figure 9:
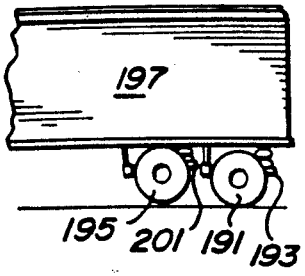
FIG. 9 is a diagrammatic partial side elevation of the arrangement shown in FIG. 8 showing the forward wheel lifted from the ground.
Figure 10:
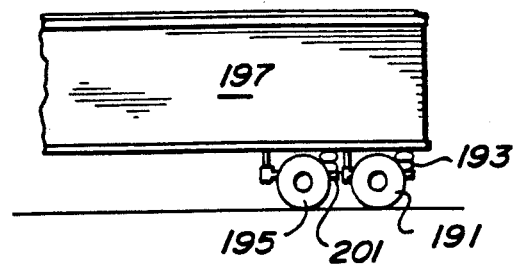
FIG. 10 is a diagrammatic partial side elevation of the arrangement of FIGS. 8 and 9 showing the trailer having both wheels in contact with the ground after deactivation of the turning arrangement.

FIGS. 8, 9 and 10 show diagrammatically the normal sequence of operations in adjusting, in accordance with the invention, of the rear steerable wheels of a tractor trailer assembly to aid in steering the trailer. In FIG. 8 it will be seen that a dual set or assembly of wheels 191 at the rear of a tractor trailer-type truck has been lifted from the road surface through the action, or actually the inactivation, of an air bag suspension 193 and activation of an air bag suspension 201 on an adjacent set of wheels. Meanwhile, the adjacent dual set of wheels 195, which, it will be understood, are not steerable, support the weight of the trailer 197 through their air bag suspension 201. While the steerable dual wheels 191 are lifted from the road surface, they are turned to the desired degree and are then returned to the road surface 199, as shown in FIG. 9. Immediately thereafter, the non-steerable dual wheel assembly 195 is lifted from the road surface through the deactivation of the air bag suspension 201 allowing a resilient means such as a torque rod, not shown, but as described before, to raise the nonsteerable wheels. The truck may then be moved slowly with the wheel assembly 191 turned in the proper direction and supporting the entire load. After the turn has been made, it will be understood that the dual wheels 195 will again be returned to the road surface while the dual wheels 191 will be lifted, at which point the trailer and wheel assemblies will appear again essentially as in FIG. 8. The dual wheels 191 are then turned back to their straight position, or, alternatively, if it is desired to make an adjustment in the angle of such wheels, are turned to a different angle. If the dual wheels 191 have been returned to a straight condition, they will then be again returned to the road surface as shown in FIG. 10 and the two suspension systems will be adjusted until substantially equal weight is taken by both dual wheel assemblies. In the alternative case, where an adjustment of the angle of the steerable wheel assembly is desired, the steerable wheels after such adjustment will again be returned to the road surface appearing again as in FIG. 9 and the trailer will be moved with the wheels in contact with the road surface until it has reached the desired position after which the procedure may be reversed again to bring the entire trailer assembly into road traveling condition. Since the actual angle of turning of the wheels 191 is not great in order to effectively steer the trailer, such turning is not visible in the side elevations shown in FIGS. 8 through 10, but will be understood to be as described. FIG. 3 shows an illustration of similar turning viewed from under a trailer.

It should be understood that while FIGS. 8 through 10 show first one set of dual wheels and then the other set of dual wheels lifted from the paving or road surface and it may be preferable to accomplish this, since it relieves all stress on such wheels, allowing easy and convenient turning and completely eliminating any wear on the tires of the dual wheels due to any dragging of the tires over the road surface, it is, as a practical matter, usually satisfactory merely to relieve the weight of the truck or trailer from the tires whereupon they can usually be relatively easily turned and the trailer then moved in an arc without detrimental wear on the tires, even if they are in actuality dragged across the road surface oblique to their intended movement. It will also be understood, that the major dragging of the tires across the road surface occurs when the truck is moved with one set of wheels turned. It is then inevitable that if the second or straight set of dual wheels and tires is not completely removed from the road surface, that such tires will be scuffed along the road surface to at least some extent. If only the weight of the wheel assembly itself is on the tires at such point, however, any wear on the tires from so doing will be relatively minor. It should be understood, therefore, that any dragging of the tires when turning the dual wheels and axles with the weight of the truck removed therefrom, will usually be insufficient to cause any major tire wear. Of course, if the pivot point of the pivotable dual wheels intersects the axle of such wheels, little scuffing will occur when the dual wheels are actually being turned. The only scuffing and dragging will then be of the adjacent set of dual wheels when the truck is actually moved.

However, as indicated above, it is preferable to have the pivot point of the pivoting wheel assembly forward of the axle position so that the wheels tend to be straightened out so they lie exactly transverse of the truck movement during highway travel. This removes the stress and strain from the rotatable wheel assembly during highway movement, but somewhat increases it during physical turning of the wheels if the wheels are not actually raised from the road surface. Since the truck is likely to be traveling the highway more than making turns in restricted quarters, on the balance, it is usually best to have the minimum stress during highway travel. Of course, all stress can also be removed from the wheels during turning also by providing an additional means for completely lifting the wheels from the pavement while turning. See, for example, FIGS. 26, 27 and 4 through 7 which disclose active means for physically raising the wheels from the road surface. One of the major advantages of the invention in removing the weight of the truck or trailer from the wheels that are to be turned is not only to facilitate such turning with relatively light apparatus, but also to allow the pivot point of the wheel assembly to be located in front of the axle as a safety feature so that the wheel assemblies are unlikely to accidentally be turned during highway travel and, if they should accidentally turn, will tend to be returned again to straight alignment by forward movement of the truck.

Figure 11:
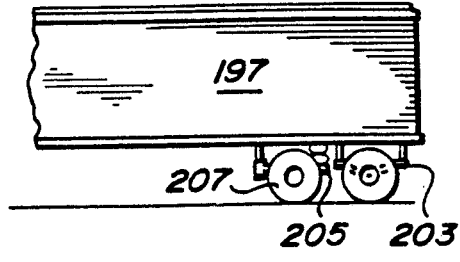
FIG. 11 shows a diagrammatic partial side elevation of a trailer in which the rear axle and wheels of a dual axle arrangement is supplied with conventional leaf spring-type suspension, while the front wheel and axle is provided with a pneumatic suspension in accordance with the invention.

FIG. 11 shows a trailer assembly in which only the front pair of dual wheels is provided with an air bag suspension arrangement for applying or relieving the weight of the truck through the wheels to or from the road surface and turning the wheels while the weight is removed. In other words, in FIG. 11, the steerable wheel assembly is the forward of the two sets of dual rear wheels. In FIG. 11 the rear set of dual wheels is shown supported by an alternative resilient arrangement other than an air bag suspension such as, for example, a leaf-spring arrangement 203 as shown. In this case it will be understood that the air bag suspension 205 will have to carry the entire burden of first relieving sufficient weight from the dual wheels 207 so they may be turned and then, while such dual wheels are turned and brought into contact with the road surface, supplying sufficient force and extension through the wheels 207 to lift the rear leaf-spring dual wheel assembly 203 from the ground or at least to release or relieve sufficient pressure of the load of the trailer from such leaf-spring dual wheels so that they will not interfere with effective turning of the rear of the tractor trailer as it is moved with the wheel assembly 207 in turned position.

Figure 12:
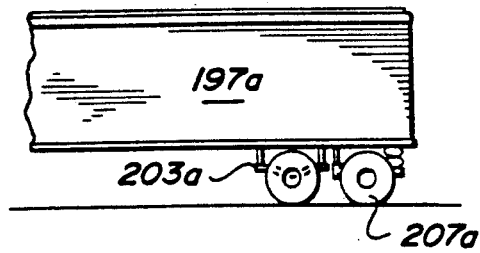
FIG. 12 shows a diagrammatic partial side elevation of a trailer arrangement in accordance with the invention in which the forward set of wheels are provided with a leaf spring and the rear set of wheels are provided with a fluid-type suspension.

FIG. 12 shows a similar arrangement to that of FIG. 11 with the exception that the leaf-spring dual wheel assembly and the air bag steerable dual wheel assembly 207 have been switched so the air bag steerable assembly is again at the rear of the trailer as shown in most of the prior views. Similar structures are identified with the same reference numerals except that the further designation "a" has been appended to each number to generally distinguish the reversed arrangement in FIG. 12 from the arrangement shown in FIG. 11. The operation is the same in FIG. 11, but reversed.

Figure 13:
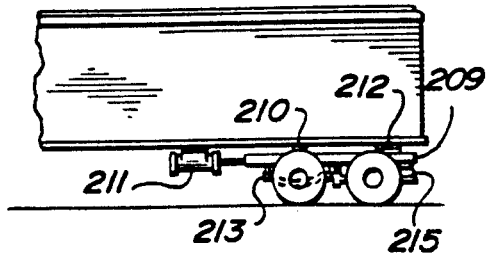
FIG. 13 shows a diagrammatic partial side elevation of a trailer arrangement in which the two sets of wheels are mounted upon a conventional bogie and in which the bogie rotates.

FIG. 13 shows a further embodiment of the invention in which the dual rear wheels of a truck are mounted upon a so-called bogie 209 which may, as shown in FIG. 13, be turned as a whole by a hydraulic cylinder 211. The dual wheels mounted upon the bogie are first a leaf-spring suspension wheel assembly 213 and an air bag suspension wheel assembly 215. It will be understood, that the operation of the wheel assemblies on the bogie will be essentially as shown in FIG. 12 with the exception that when the air bag suspension assembly 215 relieves the weight of the truck from the road surface by the action or deactivation of the air bags, the entire bogie 209 may be turned by the action of the hydraulic cylinder 211 before the air bag suspension assembly wheels are again pressed firmly into contact with the ground or road surface. This is possible because the pivot 210 of the entire bogie is at the center of the leaf-spring suspension as shown. The rear of the bogies is supported by a dual rub bar arrangement 212 somewhat similar to the arcuate beams shown in FIGS. 4 through 6 at the rear of the assembly. It will be noted that since the pivot of the bogie is near the front, the arrangement tends to straighten itself out at highway speeds. It will be understood that since, in this arrangement, the wheel assembly 213 is turned while in contact with the road surface and supporting the weight of the truck, a relatively stronger hydraulic cylinder 211 and structural assemblage will be necessary than in the other arrangements. Also, since the front dual wheels are turned while supporting the load of the trailer, a certain amount of temporary instability could be encountered. This embodiment of the invention consequently is not preferred and is shown only as an illustration of the operative scope of the invention when utilizing relief of the wheels from the surface of the road.

FIG. 14 is an expanded view of the parts of the invention disassembled from each other, but arranged generally close to their normal positions in the assembly in a preferred arrangement for a dual wheel assembly in accordance with the invention, basically as shown in FIGS. 1 to 3 or more preferably and particularly as in FIGS. 4 through 7. The air bag suspension portion which is essentially a commercial unit is shown in assembled form identified by the overall reference numeral 110. The various other parts, as well as the individual parts of the assembly 110, are identified with reference numerals identical to those used in FIGS. 4 through 7. Additional parts which are shown in FIG. 14, but not specifically listed in FIGS. 4 through 8 because not readily visible, are also listed. The parts are as follows. At the bottom is shown a cab control panel 100 which would actually be mounted in the cab of the truck or at some other location on the truck. This control panel would be linked by suitable circuit wiring with a wire trailer plug 102 on the tractor which would be interconnected with circuit wires on the trailer. An electrically driven fluid pump 177 provides fluid pressure particularly for the fluid or air spring release cylinders 103 and 105 which are mounted upon brackets 119 mounted in turn upon the pivoted plate or assembly 121 of air bag assembly 110. At the forward portion of the pivoted platform 121 is the bracket 124 which is provided at the top with a series of plates 126 listed as plates 126a, 126b and 126c which may be referred to as the top, middle and bottom plates respectively. The middle plate 126b is welded either to the lower flanges of transverse structural beams or cross member supports 103 or could be preferably welded as shown in FIG. 4 to special transverse beams 190 and 192 as shown in FIG. 4. The lower plate 126c is welded or otherwise secured to the top of the bracket 124. The top plate is bolted through a large central orifice to the central raised portion of the lower plate 126c in a manner such that the lower and upper plates 126c and 126a can rotate freely with respect to the central stationary plate 126b. The bracket 124, therefore, and the assembly 110 attached to bracket 124 can thus rotate with respect to central or middle plate 126b from which they depend. At the rear of the assembly, there is secured an arcuate beam 109 and on top of this is a somewhat smaller beam 107 which, in actual use, is welded or otherwise secured to the structural section of the trailer. The arcuate beams may be desirably approximately 8 and 4 inch beams respectively. A securing latch 111 fits over the flanges of the two to hold the two together in sliding relationship. A double-acting hydraulic cylinder 165 serves to pivot the assembly 110 through a pivot connection fitting 166 connecting the piston 167 of the cylinder 165 to the front of the plate 121 of the assembly 110 to one side of the bracket 124. An electric solenoid air regulator 106 serves to regulate pressure to the air bag suspension means 145 and 147. It will be understood that the completed assembly would provide a trailer with a steerable rear wheel assembly such as shown in FIGS. 4 through 7 that would operate as shown basically in FIGS. 8 through 10 or as in FIGS. 1 to 3. A list of the most essential parts of the assembly in addition to a basic air bag-type suspension for each set of wheels follows.

System Components

1. Two half radius I-beams. One welded to air axle suspension, the other beam is welded to the trailer or truck.
2. Two maxi brakes (safety spring-activated air release cylinders) and locking pins.
3. One hydraulic cylinder two-way double acting.
4. Four one-half inch solenoid valves.
5. Two one-half inch air regulators.
6. Approximately fifty feet of electrical wire.
7. One six-wire trailer plug.
8. One steering pin.
9. Two steering pin plates (round).
10. Reinforced cross members.
11. One electric hydraulic pump.
12. One cab panel including six switches appropriate angle indicators in red on indicators, locks and the like.
13. Latching lips welded on the steering beam.

Figure 15:
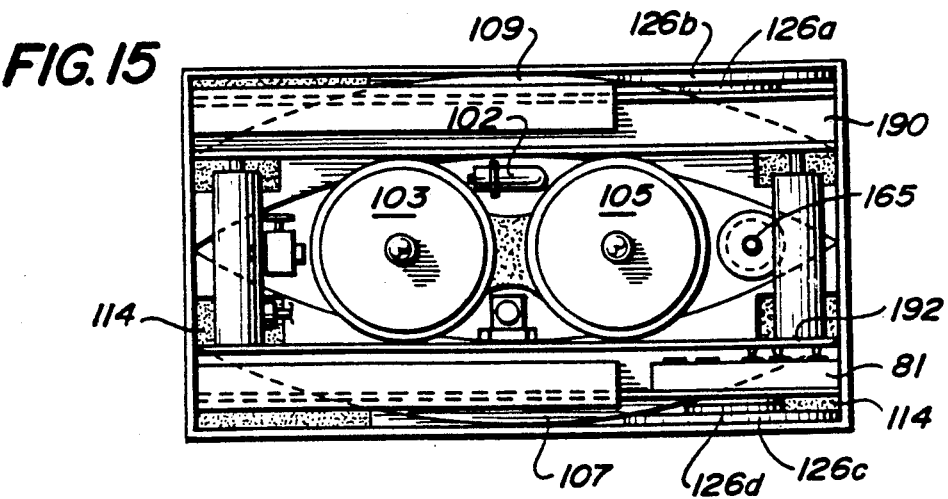
FIG. 15 shows the parts necessary for the conversion or retrofitting of a truck with the components of the auxiliary steering arrangement of the invention arranged in a kit.

It will be understood that the above list comprises essentially those parts necessary to convert a standard air-bag suspension system to a steerable system. All these parts may be provided in a kit and will vary somewhat according to the manufacture of the axle and air-bag suspension systems. It is within the scope of the present invention, therefore, to provide a kit of parts for converting an ordinary air-bag type suspension system to a steerable air-bag jacking and suspension system. FIG. 15 shows a package or kit containing such parts adapted to make the necessary conversion as described. It will be understood that the parts shown in the kit 15 are essentially the parts shown in FIG. 14 for the rear suspension system which are not contained in the normal commercial air-bag type suspension, and are designated with the same refrence numerals. The packaging material 114 for the kit is labeled with the same reference numerals in all portions of the kit.

Figure 16:
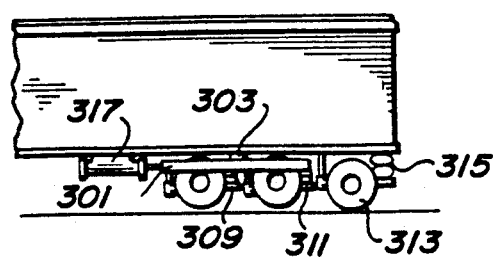
FIG. 16 shows, in diagrammatic side elevation, a trailer arrangement in which the two sets of wheels are mounted upon a bogie and a third set of wheels is provided with a combination suspension and retraction arrangement so that the entire bogie may be lifted and turned, in accordance with the invention, while the third set of wheels is extended to support the weight of the trailer.
Figure 17:
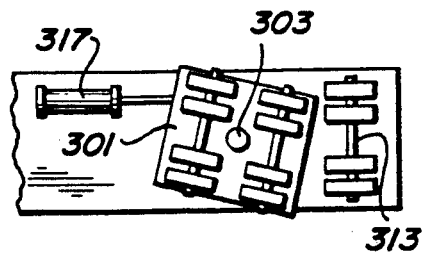
FIG. 17 is a bottom diagrammatic view of the arrangement shown in FIG. 15 showing the bogie turned or rotated.

FIGS. 16 and 17 show respectively a diagrammatical side elevation and a bottom view of an alternative system somewhat similar to the bogie arrangement of FIG. 13. In FIG. 16 it may be seen that a rotatable bogie 301 pivoted in the center by or on a pivot pin 303 is provided with two air-bag type suspended dual wheel assemblies, both provided with air-bag suspensions 309 and 311. A third air suspension wheel assembly 313 having air bags 315 which are shown as a particularly rugged air-bag suspension system having three separate air bags is provided to the rear of the bogie 301. In this particular embodiment of the invention, it will be understood that each of the wheel assemblies 305, 307 and 313 will be substantially stationary wheel assemblies rather than pivoting wheel assemblies. However, it will also be seen that since the bogie 301 is pivoted, the entire bogie may be turned, turning the two sets of dual wheel assemblies with it. In order to make this turn, however, it is necessary first to lift the entire rear portion of the truck, including the bogie 301, from the ground and such lifting is accomplished by the heavy duty air bag assemblies 315 by forcing the stationary wheel assembly 313 against the road surface. The stationary wheel assembly 313 will, of course, have to be either located behind the center of gravity of the trailer or alternatively the front of the trailer will have to be securely attached to the tractor through the "fifth wheel". Since the truck is not moved with only the wheels 313 supporting the trailer and its load, no great difficulty should be encountered. When the two sets of dual wheels 305 and 307 are lifted from the road surface or, alternatively, sufficient weight is relieved from the dual wheels 305 and 307 by action of the rear air bag jacking means 315, the entire bogie may be turned by hydraulic cylinder 317. After the bogie is positioned in the correct angular position for movement of the rear of the trailer in the direction desired when force is applied to the front of the trailer through the usual fifth-wheel, the air suspension 315 may be relieved so that the weight is again returned to the dual wheels 305 and 307 on the bogie 301. The trailer is then moved by operation of the tractor associated with such trailer and after the trailer has reached the point which the operator desires, the air bag suspension 315 may again be activated to lift the dual wheels 305 and 307 mounted upon the bogie from the ground so that the bogie may be turned back to the straight or longitudinal direction after which the air suspension 315 may be relieved and the dual wheels 305 and 307 on the bogie 301 returned to the ground for highway travel.

It will be understood that the embodiment of the invention shown in FIGS. 16 and 17 has an advantage when very heavy loads are present in a truck or movement during the turn must be across a rough surface. In other words, the arrangement shown in FIGS. 16 and 17, as in FIG. 13, provides for a pair of dual wheels to be in contact with the road surface, not only during highway travel, but during turning of the rear of the trailer. The rear wheels 313 may be used customarily during highway travel, but are more likely to be used only when very heavy loads are being carried during highway travel or during preparation of the truck for rotation of the bogie in order to steer the rear of the trailer. In other words, the arrangements shown in FIGS. 16 and 17 is essentially similar, except for the rotatable bogie, to present arrangements in very heavy trucks which provide for a third set of dual wheels to be brought into operation when very heavy loads are carried, but not when a truck is unloaded or only partially loaded. As pointed out above, the more wheels which are in contact at longitudinally spaced points along a truck body during turning, the more wear will be generated upon such tires, the more "plowing" is likely to take place if the truck is not articulated and the more danger there is of "jackknifing" if the truck is an articulated vehicle. The pivot point 303 of the bogie 301, shown in FIGS. 16 and 17, is shown in the center of the bogie. Relatively more massive locking means will thus be necessary to make certain the bogie does not turn during highway travel. The pivot point could also desirably be arranged on the forward portion of the bogie as shown in FIG. 13 to render the turning fail-safe for highway travel and this will be the normal preferred arrangement, the central arrangement on the multi-axle bogie being a non-preferred arrangement just as having the pivot point of an individual wheel assembly at the center of the assembly is not a preferred arrangement.

Figure 18:
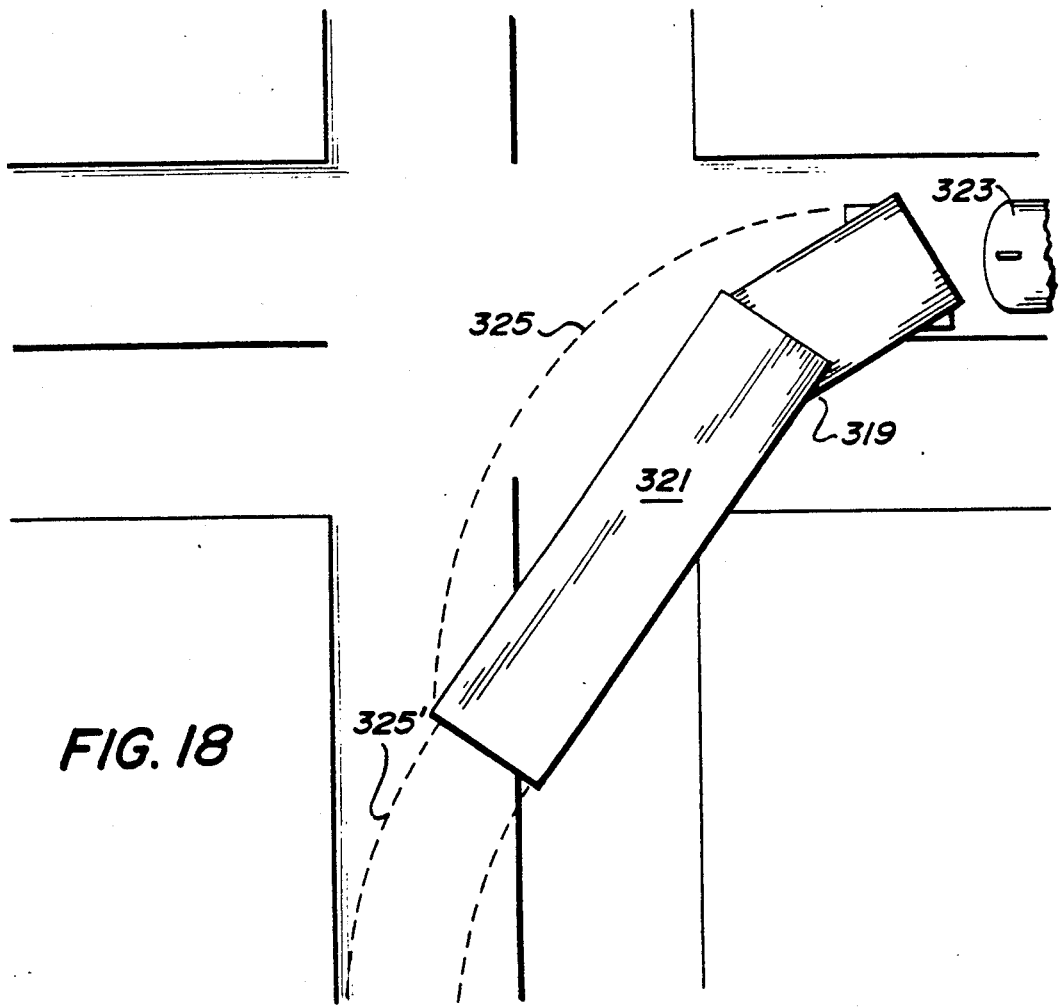
FIG. 18 shows, in diagrammatic form, an aerial view of a conventional tractor trailer truck making a turn at a congested corner.

FIG. 18 is a plan view showing a tractor trailer truck assembly 319 attempting to negotiate a fairly sharp corner in the presence of parked vehicles. It will be evident by an examination of FIG. 18 and the tracking indications that the trailer 321 is in imminent danger of collision with any building on the corner and the tractor with an on-coming vehicle such as vehicle 323, as shown by the dotted lines 325 and 325', which show the path which will normally be tracked by the front and rear wheels respectively of the tractor trailer assembly. This is the normal situation in a truck arrangement not provided with a means for steering the rear wheels of the trailer.

Figure 19:
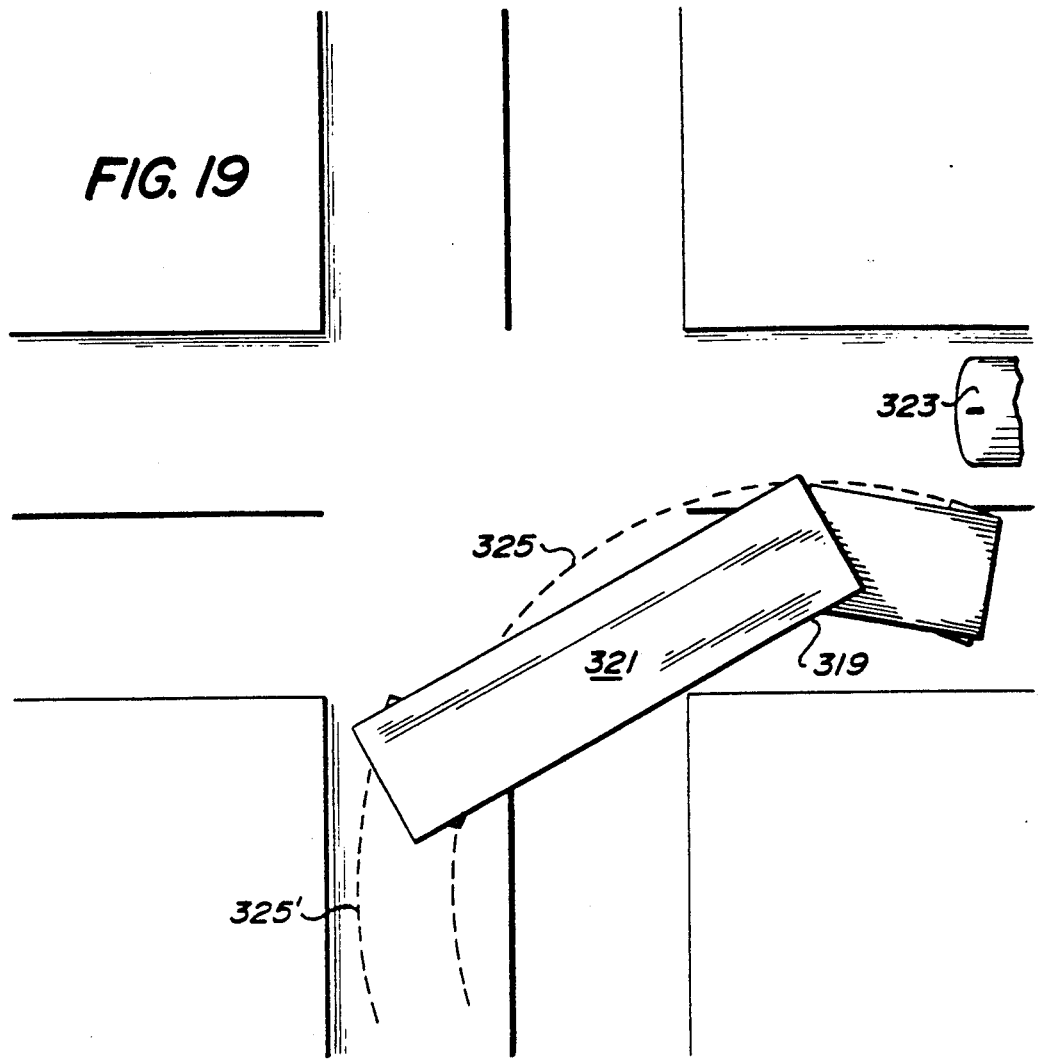
FIG. 19 shows diagrammatically a tractor trailer truck equipped with the auxiliary steering mechanism and means of the invention making a turn at a congested corner.

FIG. 19 shows the same tractor trailer assembly 319 as in FIG. 18 negotiating substantially the same curve, but now provided with steering on the rear wheels in accordance with the present invention. It will be seen that the dotted lines indicating the track 325' of the rear of the trailer follows rather closely the tracks 325 indicated on the drawing which mark the path of the drive wheels of the tractor of the tractor trailer combination. This close tracking illustrates very graphically the usefulness of the present invention. It will be understood, furthermore, that similar advantages will be gained when it is desired to park the entire truck in a restricted space or to back the entire truck, since the driver can provide for steering through the rear steering means rather than having to depend entirely during backing upon the pivot angle which he can negotiate between the tractor and the trailer. It will be seen in FIG. 19 that the rear steering may actually be used rather easily to cause the trailer to track, if desired, to the outside of the track of the drivewheels of the tractor rather than to the inside, as will normally occur in a trailer not provided with a rear steering mechanism arrangement.

Figure 20:
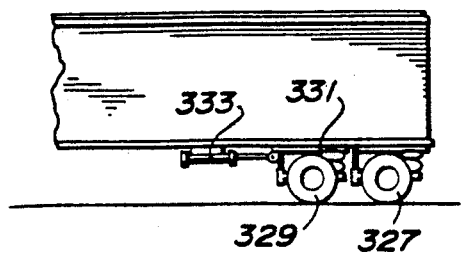
FIG. 20 shows, in diagrammatic side elevation, an arrangement in which one dual axle is mounted on a track or slide arrangement provided to move one dual axle farther from the other during turning of the axle to facilitate greater rotation of the axle for sharper turning maneuvers.
Figure 21:
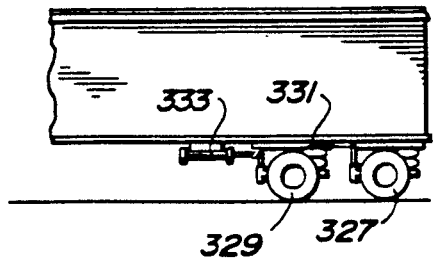
FIG. 21 shows the truck shown in FIG. 20 with the slide or track arrangement moved forwardly to provide more clearance between the wheels of the two dual axles to allow wider turning angles of the rear steerable wheel assembly.

FIGS. 20 and 21 show, in diagrammatic form, a trailer having a dual wheel or axle assembly including a first steerable wheel assembly 327 similar to that shown and described in connection with the previous figures and a second non-steerable wheel assembly 329 also similar to that shown and described in connection with the previous figures. The non-steerable wheel assembly 329, however, instead of being stationary, except for vertical movement effected by its air bag-type suspension, is mounted upon a longitudinally oriented track or slide structure 331 so that during highway travel, the two dual wheel assemblies 327 and 329 may be positioned in close proximity to each other to decrease tire wear as much as possible while negotiating curves and the like, but when the opposite steerable wheel assembly is used for effecting relatively sharp sidewise or lateral movements, the non-steerable wheel assembly can be moved forwardly upon its track arrangement 331 by the action of hydraulic cylinder 333 so there is no chance of the tires on the two axles interferring with each other. The steerable wheel assembly 329 can thus be turned at a greater angle for sharper turns than it could otherwise. The non-steerable wheel assembly is shown in highway position in FIG. 20 and in auxiliary steering position in FIG. 21.

Figure 22:
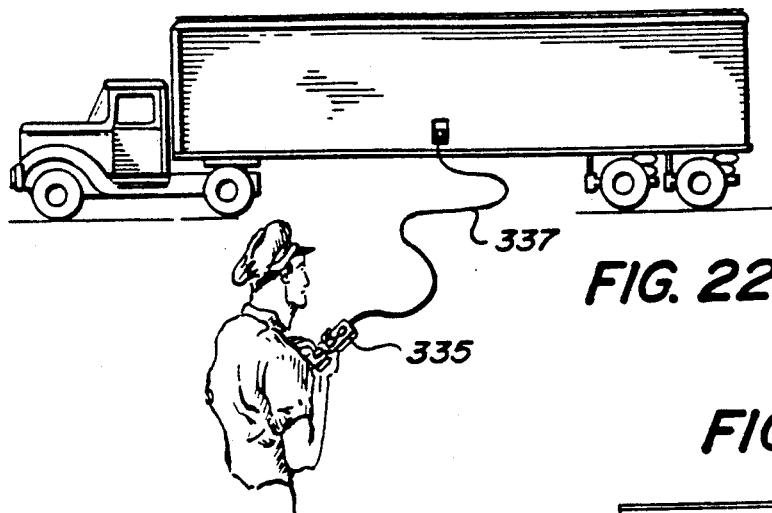
FIG. 22 shows the operational sequence of the invention being effected from a control point provided on the outside of the truck cab from which vantage point the driver can easily view the turning angle of the rear axle and estimate its effectiveness.
Figure 23A:
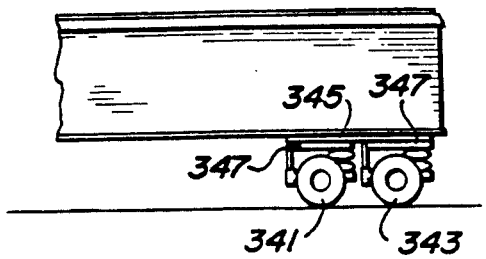
FIGS. 23A through 23E show, in diagrammatic elevation and diagrammatic underviews, a trailer arrangement in which the two axles of a dual axle trailer are both provided with the turning mechanism of the invention so that, if desired, both axles can be turned and the trailer can be moved with both sets of rear wheels in contact with the road surface. Several stages of turning are shown in FIGS. 23A through 23E.
Figure 23B:
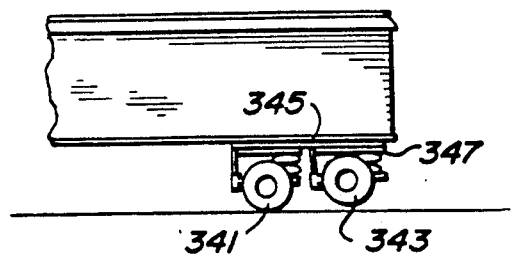
Figure 23C:
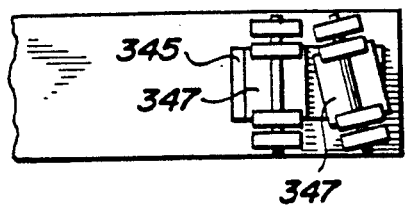
Figure 23D:
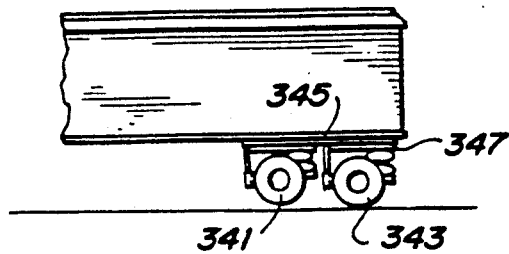
Figure 23E:
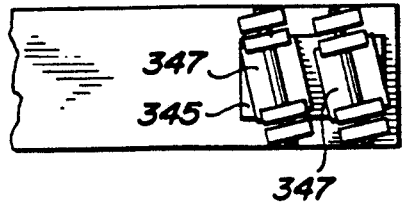

FIG. 22 shows diagrammatically, in somewhat distorted form, the use of an extension pushbutton-type control 335 to operate the system of the invention from outside the cab of the truck. The driver can, in this manner, watch the particular operation of the wheel assemblies as he operates them. It will be understood that the control 335 may have its cable 337 plugged into multicontact plugs, as known in the art, provided at various locations on the truck including the cab so that the driver, by merely plugging in his control cable at a convenient plug, may operate the apparatus of the invention in almost any convenient location around or upon the truck.

FIG. 23 comprises a series of diagrammatic views A through E showing a trailer equipped with a dual set of rear wheels 341 and 343, both of which are steerable. Both sets of wheels are mounted upon a stationary plate 345 attached to the bottom of the trailer body to which is pivoted a second plate 347 upon which is mounted either a forward or rear dual wheel assembly provided with an air bag suspension. With this arrangement, both sets of dual wheels can be turned so that both can be in contact with the ground as the rear of the trailer is turned. The sequence of turning is shown in the views A through E of FIG. 23 where the first view "A" shows the road condition of both wheel assemblies 341 and 343 firmly in contact with the road paving or surface. The second view "B" shows the rear assembly 343 partially lifted from the road surface. It will be understood that while the diagram shows the dual wheels on the rear assembly 343 actually lifted from the road surface, the diagram is intended to diagrammatically indicate also the condition where the rear assembly merely has the trailer weight relieved from it by additional activation of the air bag suspension and jacking means of the forward dual wheel assembly 341. View "C" is a diagrammatic underneath view of the trailer showing the rear wheel assembly 343 turned at an angle for steering the trailer to the right of the trailer. View "D" again shows a side elevation of the trailer with the forward wheel assembly now diagrammatically lifted from the road surface to prepare it for pivoting or turning and view "E" is a bottom view of the trailer showing both wheel assemblies 341 and 343 turned in position for moving the trailer to the right of the trailer if viewed right-side up. It will be understood that it may, at times, be advantageous, as shown in FIG. 23, to have both sets of wheels firmly in contact with the street or road surface when the truck is actually moved to avoid any possible damage to either the paving or the truck structure.

Figure 24A:
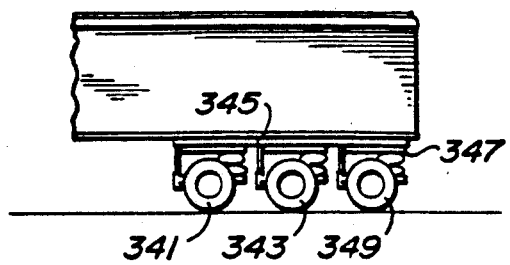
FIGS. 24A and 24B show, in diagrammatic elevation, a trailer arrangement similar to that shown in FIG. 23 wherein the trailer is provided with three sets of wheels all turnable by means of the mechanism of the invention. Several stages of turning are shown in diagrams A through E.
Figure 24B:
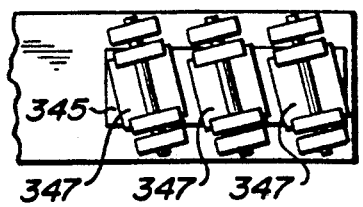

FIG. 24 comprises two views A and B comparable to views A and E of FIG. 23, but showing a trailer having three sets or assemblies of wheels 341, 343, 347 and 349, all of which may be turned as shown in view "B". The triple wheel assembly arrangement shown in FIG. 24 may be useful at times when either very heavy loads or very weak paving surfaces are involved. All the wheel assemblies are pivoted to a stationary plate 345 which is the same, except for being somewhat longer, as the stationary plate 345 in FIG. 23.

Figure 25:
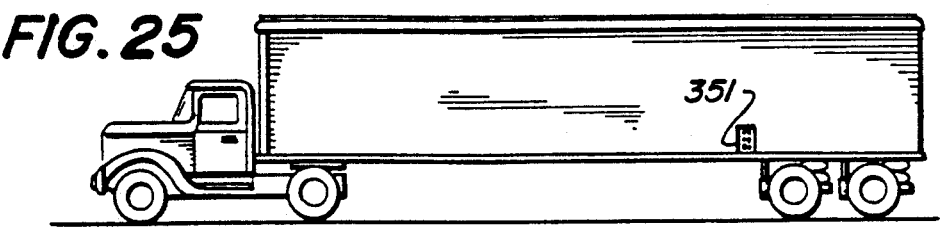
FIG. 25 shows an alternative arrangement in which a control panel for effecting the operational sequence of the invention is located on the exterior of the truck.

FIG. 25 diagrammatically shows a tractor trailer combination in accordance with the invention in which a central panel 351 for operating the rear wheel turning sequence of the invention is mounted on the side of the trailer directly adjacent the dual wheel.

Figures 26, 27:
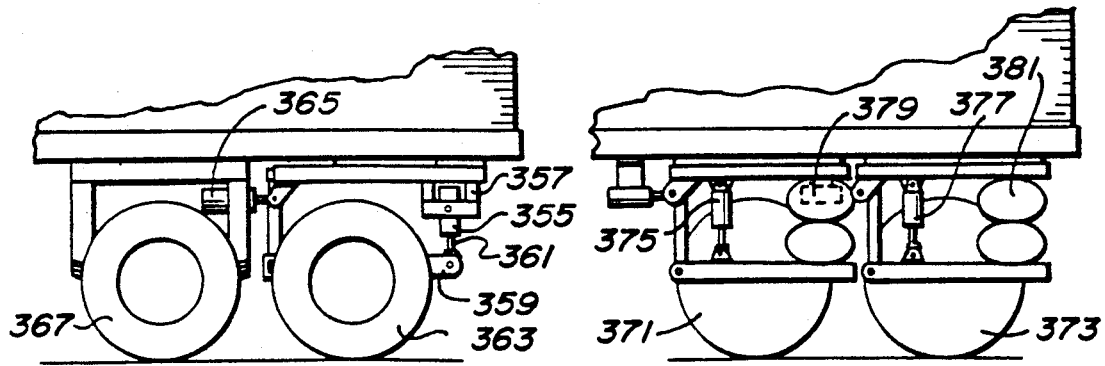
FIG. 26 is a diagrammatic partial side elevation of the rear of a truck or trailer showing an alternative embodiment of a fluid cylinder means in place of an air bag means for suspension and movement of the rear set of dual axle wheels.
FIG. 27 is a diagrammatic partial side elevation of the rear of a truck or trailer showing an improved arrangement of the invention including an additional fluid cylinder means for actively lifting one or the other of the wheel assemblies from the road surface.

FIG. 26 shows an alternative embodiment of the invention in which a fluid cylinder 355 is pivoted to a bracket 357 in a manner to allow the transverse arm 359 of the wheel suspension to be guided upwardly or downwardly by the piston rod 361 of the cylinder 355. It will be understood that the fluid cylinder 355 is preferably a gas type cylinder so the suspension will be resilient, but various hydraulic arrangements could also be used with proper modifications. With the arrangement shown, and using a double acting cylinder, the dual wheels 363 can be both pressed firmly upon the road surface or lifted, at least partially, from the road surface, while the cylinder 365 turns the wheel assembly 363. A second set of dual wheels 367 is shown with a conventional leaf-spring suspension that supports the weight of the truck while the dual wheel assembly 363 is elevated or lifted.

FIG. 27 depicts diagrammatically an arrangement of the invention in which two sets or assemblies of dual wheels 371 and 373 are both pivotable and includes a pivoted fluid cylinder means 375 and 377 arranged to actively lift the wheels from the road surface when the air bag assemblies 379 and 381 are relieved. The actual consecutive movement of the wheels would, of course, be as shown in FIG. 23.

Figure 28:
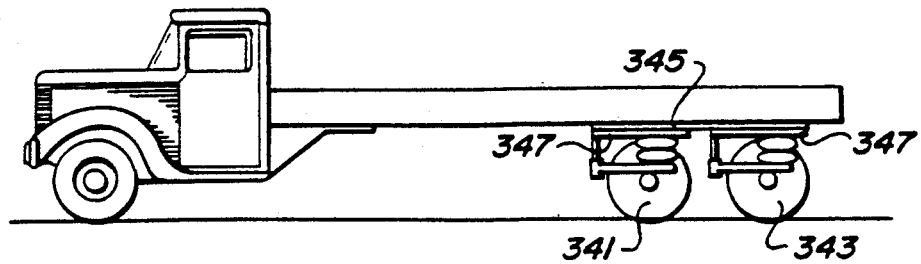
FIG. 28 is a diagrammatic side elevation of an elongated flat bed truck making use of the invention on the dual rear wheels illustrating that the invention can be useful on stretched out trucks as well as on trailers of a tractor trailer combination.

FIG. 28 shows an arrangement similar to that shown for a trailer in FIG. 23 applied to an elongated flat bed truck to illustrate that the invention, while most useful with the steering of trailers of tractor trailer arrangements, can also be applied to a unitary truck body for maneuvering in constricted areas.

Figure 29:
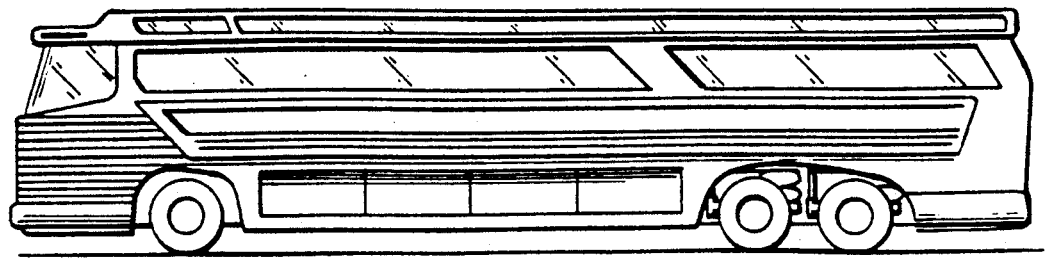
FIG. 29 is a diagrammatic view of a dual wheel passenger vehicle, i.e. in this case a bus, equipped with the invention.

FIG. 29 shows the arrangement of the invention applied to a passenger vehicle such as a bus designed for use in narrow, constricted streets.

Figure 30:
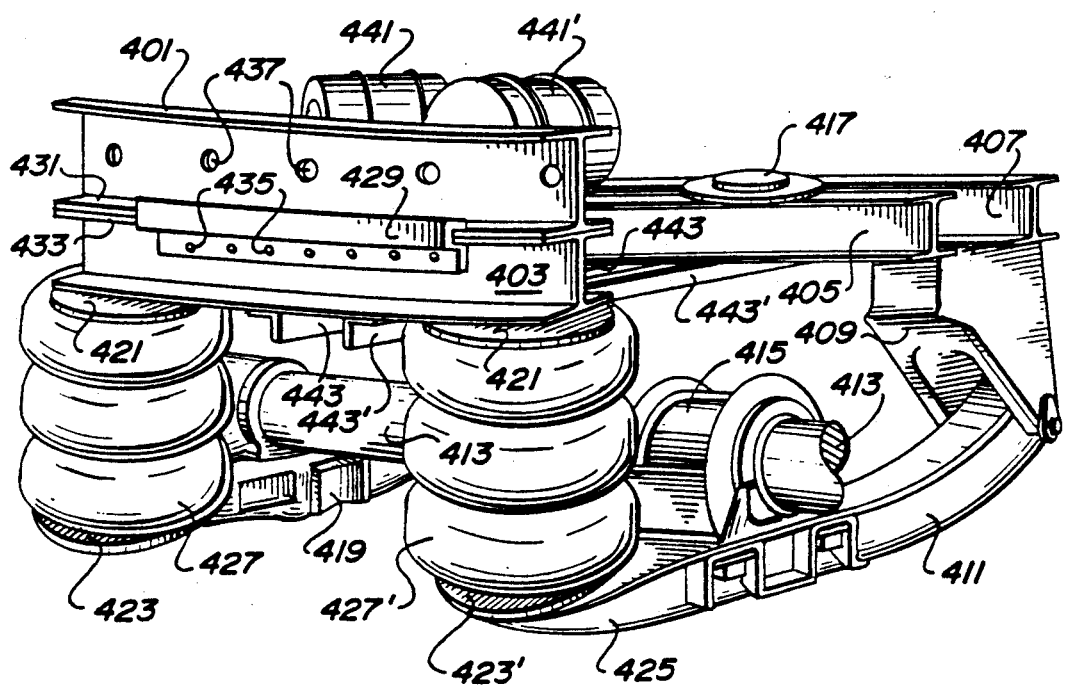
FIG. 30 is a diagramatic representation of a further embodiment of the invention used in combination with a different air bag-type suspension arrangement.

FIG. 30 shows a further preferred embodiment of the invention adapted to a somewhat different air bag-type suspension system. In FIG. 30, the pivoting wheel assembly per se only is shown. It should be understood that when mounted upon a trailer the two chassis rails of the trailer will pass across the top of the assembly in a position such that a curved locking beam 401 can be welded between the chassis rails, not shown, with the bottom of the curved beam 401 approximately level with the bottoms of the chassis rails as explained previously for FIGS. 4 through 7. This allows the lower curved bearing beam 403 to slide from side to side under the upper curved beam and the chassis rails, or longitudinal beams, of the trailer.

Meanwhile, two transverse beams 405 and 407 are positioned forward of the lower curved bearing beam 403. These two transverse beams 405 and 407 are welded to the top of a bracket 409 which supports a lower pivoted arm or trailing arm 411 which in turn supports the wheel assembly axle 413 journaled in bearings or journal boxes 415. The transverse beams 405 and 407 pass under the chassis rails, not shown, and rest upon such chassis rails, but are not normally welded to the chassis rails. A pivot plate, broadly referred to as a pivot pin, 417, is mounted on top of the two transverse beams 405 and 407. A second trailing arm 419, identical to the trailing arm 411, is shown on the opposite side of the wheel assembly.

Brackets 421 and 421' are provided at the lower outer ends of the lower curved bearing beam 403. These two brackets are opposed by lower brackets 423 and 423' on the extreme rear ends, 425, of the trailing beams 411 and 419. Air bag suspensions 427 and 427' are mounted between the brackets 421 and 423. The upper and lower curved beams 401 and 403 are held together by the lips of the latch 429 which extend over the opposed flanges 431 and 433 of the beams 401 and 403. The latch 429 is secured to the lower curved beam 403 by the fastenings 435. Orifices 437 in the top curved beam 401 accommodate locking pins 439 which are mounted upon pistons, not shown, of the air release spring lock cylinders 441 and 441', which are attached to the top of the assembly by an arrangement, not shown, and serve when activated to lock the pivoting wheel assembly as a whole to the top curved beam 401. Two structural angles 443 and 443' are welded to the bottom of the bottom curved beam and extend forwardly to either side of the pivot pin 417 or plate where the angles are welded to the bottoms of the transverse plates 405 and 407. The two structural angles 443 and 443' serve to tie the upper portions of the front and rear sections of the assembly together.

It will be understood that the pivoting assembly illustrated in FIG. 30 operates in the same manner as the other preferred assembly shown in FIGS. 4 through 7, the only essential differences being in the construction arrangement.

As will be recognized from the foregoing description and drawings referred to in such description, the present invention provides a ready and convenient means for providing steerability to the rear of trailers, and tractor trailer combinations in particular, and to other type vehicles where applicable. The invention is very convenient, as has been explained, to apply or retrofit to existing trucks and tractor trailer assemblies and isboth safe and durable. The system may be provided with additional safety features, such as interlocks, to prevent movement of the tractor at any speed above a set limit of perhaps ten miles per hour or even five miles per hour when the rear wheels of the tractor are turned. Furthermore, it will be understood that the steerable wheel assemblies will be absolutely locked in place by appropriate means such as particularly shown in FIGS. 4 through 7 during movement of the truck preferably either with the wheels turned at low speeds or with the wheels in highway position during higher speed travel. Furthermore, as explained, one of the principle advantages of the invention is that the steerable wheels, because they are pivoted ahead of the axle involved, will, upon resumption of highway operation, tend to be turned into a straight condition and, therefore, places a minimum stress on the apparatus. The critical step of relieving the weight of the truck from the wheel assembly before pivoting such assembly enables the wheel assemby to be easily turned, even though the axle does not intersect the pivot point.

In this application and the appended claims, the following terms are intended to have the indicated meanings.

The terminology "transport-type vehicle" means a vehicle for use on roads and streets to carry cargo or passengers, usually for hire, such as, for example, a truck and particularly a tractor trailer-type truck, but including other multiple wheel-type trucks as well and also including buses and the like.

The terminology "rotatably movable" means the relationship of being movable by turning essentially about a pivot point or imaginary axis.

The term "load" when applied to a vehicle means the weight of any cargo or passengers.

The terminology "rotated or rotatable axle" or "rotated or rotatable wheel mounting" means an axle that is turned or pivoted about an axis transverse to the longitudinal axis of the axle or of any axle mounted upon the wheel mounting.

The terminology "auxiliary steering" refers to steering accomplished as an adjunct or aid to a principal or usual steering arrangement and not used all the time such as a steering arrangement provided on the rear of a truck for use in special situations.

The term "fluid means" or "fluid cylinder means" refers to apparatus extensible by the use of either gas or liquid pressure.

The terminology "safety spring-activated air release cylinder" refers to a commercial-type fluid pressure device in which the device is actuated by a spring which always biases the device to active status and is deactivated by the application of air pressure which opposes the spring and counteracts any force normally provided by the spring, thus deactivating the device.

The term "turning" or "turn" when applied to wheels or dual wheels, unless otherwise defined or clear from its context, refers not to rotation of the wheel on its axis, but to rotation or turning of the axle upon which a wheel is journaled about an axis transverse to its longitudinal axis.

The terms "longitudinal axis" and "transverse axis" when referring to a transport-type vehicle refer to the long axis of the vehicle along which it normally moves and an axis at right angles or transverse to said long axis along which the vehicle may at times have a component of motion.

The terms "transverse rotation" or "transversely rotating" when referring to the axle of a wheel or similar relationship means rotation of such axle about an axis transverse or at right angles to the longitudinal extent of said axle.

The term "transversely aligned" means aligned transversely parallel to the "transverse axis" of a vehicle.

The terms "transversely rotatable axle" or "transversely rotatable" means an axle or the like which is subject to transverse rotation.

The terminology "depletion of air" means the release of air pressure from a pneumatic or air bag-type suspension, deactivating such suspension.

The terminology "relieving the weight from a dual axle", "relieving the weight from the wheels", "effectively raising the wheels from the road", "effectively raising the wheel assembly from the road surface" and the like refer broadly either to lifting wheels or removing the weight from wheels and includes both physical removal of such wheels from the ground or road surface as well as merely relieving the weight of the vehicle itself and any load from the wheels or axle in question so that the wheels or wheel assembly can be moved transversely, or other than in their designed direction of movement, with only the weight of the assembly in question causing friction between the tires and the road surface.

The terms "active" or "passive" when applied to lifting of the wheel assemblies or wheels refers in the case of "active" to physical application of an upward pressure away from the road surface to the wheel assembly or the axles, and in the case of "passive" to the decrease of any downward pressure upon the wheel assembly toward the road surface.

While the present invention has been described at some length and with some particularity with respect to several described embodiments, it is not intended that it should be limited to any such particulars or embodiments or any particular embodiment, but is to be construed broadly with reference to the appended claims so as to provide the broadest possible interpretation of such claims in view of the prior art and therefore to effectively encompass the intended scope of the invention.

We claim:

1. A method of providing auxiliary rear steering for a transport-type vehicle having a longitudinal axis and a transverse axis at right angles to the longitudinal axis, said vehicle also having a substantial length and dual rear axles normally aligned for over-the-road operation with the transverse axis, said vehicle being further provided with a vertical axle movement effecting means for at least one of said dual axles and transverse axle rotation effecting means associated with at least one of said dual axles, comprising, when it is desired to auxiliarily steer said vehicle:

(a) relieving the weight of said vehicle and any load thereupon from the one of said dual axles provided with the transverse axle rotation effecting means by at least partially raising said one dual axle relative to the other axle by operating the vertical axle movement effecting means,
(b) when at least a substantial proportion of the combined weight of the vehicle and any load thereupon is relieved from said transversely rotatable axle, transversely rotating said transversely rotatable axle a predetermined amount deviating from alignment with the transverse axis of said vehicle to a non-transversely oriented alignment by operating said transverse axle rotation effecting means, the other dual axle remaining substantially aligned with the transverse axis of said vehicle,
(c) after said transversely rotatable axle is rotated said predetermined amount, reapplying the combined weight of the vehicle and any load thereupon to the non-transversely oriented rotated dual axle by lowering said non-transversely oriented axle relative to the other dual axle,
(d) at least partially removing the combined weight of the vehicle and any load thereupon from the transversely aligned axle by raising it relative to the non-transversely aligned axle,
(e) moving the vehicle in a direction having a substantial component of motion parallel to the longitudinal axis of the vehicle so that the non-transversely aligned rear axle initiates a component of motion of the rear portion of the vehicle at least partially to the side or with a component of motion transverse with respect to the longitudinal axis of the vehicle in a desired direction, whereby the rear of the vehicle is caused to track in a different direction than it would otherwise upon activation of drive wheels associated with said vehicle.

2. A method for auxiliary steering of the rear of a transport-type vehicle in accordance with claim 1 additionally comprising:
(f) after the vehicle is moved a predetermined distance in a desired direction with the said one rear axle non-transversely oriented with respect to the vehicle, stopping the vehicle,
(g) reapplying the weight of the vehicle and any load thereupon to the transversely oriented dual axle and at least partially removing said weight from the non-transversely oriented axle by relatively lowering said transversely oriented axle with respect to said non-transversely rotated axle,
(h) after the weight of the vehicle is reapplied to the transversely oriented axle and at least partially removed from the non-transversely oriented axle rerotating the non-transversely oriented axle to a different rotational orientation, and
(i) reapplying at least a substantial proportion of the weight of the vehicle and any load thereupon to the rerotated axle to prepare said vehicle for horizontal movement in accordance with such different rotational orientation.

3. A method for auxiliary steering of the rear of a transport-type vehicle in accordance with claim 2 wherein the rotated axle is rerotated to a further different non-transverse orientation from the initial orientation and the weight of the vehicle and any load thereupon is reapplied to the rotated axle by adjustment of the relative height of the two axles whereupon the rear of the vehicle is caused to track in a different direction with a different component of motion transverse with respect to the longitudinal axis of the vehicle upon activation of the drive wheels of the vehicle from the initial tracking movement with the initial non-transverse orientation of the transversely rotatable axle.

4. A method for auxiliary steering of the rear of a transport-type vehicle in accordance with claim 2 wherein the non-transversely oriented axle is rotated back to an orientation at right angles to the longitudinal axis of the vehicle suitable for highway movement and the weight of the vehicle and any load thereupon is readjusted more or less equally between the two dual axles by adjustment of the relative height of the two axles by the vertical axle movement effecting means.

5. A method for auxiliary steering of the rear of a transport-type vehicle in accordance with claims 1, 2, 3 or 4 wherein the relative height of the two axles is adjusted by vertical movement of a non-transversely rotatable axle.

6. A method for auxiliary steering of the rear of a transport-type vehicle in accordance with claims 1, 2, 3 or 4 wherein the relative height of the two axles is adjusted by vertical movement of a transversely rotatable axle.

7. A method for auxiliary steering of the rear of a transport-type vehicle in accordance with claims 1, 2, 3 or 4 wherein the relative height of the two axles is adjusted by vertical movement of both axles as required.

8. A method for auxiliary steering of the rear of a transport-type vehicle in accordance with claims 3 or 4 wherein each dual axle of said vehicle is provided with a vertical axle movement effecting means and each is rotatable by a rotation effecting means wherein the height adjustments are made alternatively to allow each such dual axle to be turned to the same non-transverse orientation and the vehicle is then moved with its weight supported by both axles in said same non-transverse orientation.

9. A method for auxiliary steering of the rear of a transport-type vehicle in accordance with claim 5 by initially moving the non-transversely rotatable axle downwardly until it supports a substantial major portion of the weight of the vehicle and any load thereupon, and thereafter, subsequent to the transverse rotation of the a transversely rotatable axle, moving the non-rotatable axle upwardly until a substantial major portion of the weight of the vehicle and any load thereupon is supported by the non-transversely rotated axle, and thereupon, after the vehicle is moved by activation of the drive wheels, moving the non-transversely rotatable axle downwardly to take up a substantial major portion of the combined weight of the vehicle and any load while the transversely rotated axle is rotated to a different orientation.

10. A method for auxiliary steering of the rear of a transport-type vehicle in accordance with claim 6 by initially moving a transversly rotatable axle upwardly until a non-transversly rotatable axle supports a substantial major portion of the weight of the vehicle and any load thereupon, and thereafter, subsequent to the transverse rotation of the rotatable axle, moving the rotatable axle downwardly until a substantial major portion of the weight of the vehicle and any load thereupon is supported by the rotated axle, and thereupon, after the vehicle is moved by activation of the drive wheels, moving the rotatable axle upwardly to reapply a substantial major portion of the weight of the combined weight of the vehicle and any load to the non-rotatable axle while the rotated axle is rotated to a different angle.

11. A method for auxiliary steering of the rear of a transport-type vehicle, in accordance with claim 7, wherein the relative height of the two dual axles is adjusted by relative movement of one or the other of the dual axles dependent upon external conditions.

12. An apparatus system for auxiliary rear steering of a transport-type vehicle having dual rear axles comprising:
  (a) a transversely rotatable mounting means for at least one of the dual rear axles of said vehicle,
  (b) a vertical displacement means for forcefully moving at least one of the dual rear axles of said vehicle in a vertical direction in response to a control signal,
  (c) means for exerting a horizontally oriented turning force on the rotatable mounting means, and
  (d) control means operable by the vehicle operator to vertically move the dual axle provided with the vertical movement means and to turn the rotatable mounting means in a horizontal plane in a sequence providing for effective relief of a major proportion of the weight of the vehicle and any cargo thereupon from the rear axle provided with the rotatable mounting means followed by turning of said rotatable rear axle followed by reapplication of the weight of the vehicle and any cargo to said rotated axle and effective relief from the other axle of a major proportion of the combined weight of the vehicle and any cargo thereupon and allowing the rear of the vehicle to be moved to the side upon the operation of the drive wheels of the vehicle.

13. A system for auxiliary rear steering of a transport-type vehicle in accordance with claim 12 wherein the transversely rotatable mounting means is associated with a first one of the dual axles and the means for moving one of the dual rear axles in a vertical direction is associated with a second one of the dual axles.

14. A system for auxiliary rear steering of a transport-type vehicle in accordance with claim 12 having dual axles wherein the transversely rotatable mounting means and the vertical displacement means are both associated with the same one of the dual axles.

15. A system for auxiliary rear steering of a transport-type vehicle in accordance with claim 12 wherein each dual axle is provided with vertical displacement means.

16. A system for auxiliary steering of a transport-type vehicle in accordance with claim 15 wherein each dual axle is supported by a transversely rotatable mounting.

17. A system for auxiliary steering of a transport-type vehicle in accordance with claims 13, 14, 15 or 16 additionally comprising:
  (e) locking means for temporarily locking the rotatable mounting means in a desired fixed horizontal rotational relationship with the longitudinal axis of said vehicle.

18. A system for auxiliary steering of a transport-type vehicle in accordance with claim 17 wherein the vertical displacement means for vertically moving at least one of the dual axles is a fluid medium-type displacement means.

19. A system for auxiliary steering of a transport-type vehicle in accordance with claim 18 wherein the fluid medium-type displacement means is a pneumatic air bag means that also serves as a pneumatic suspension means.

20. A system for auxiliary steering of a transport-type vehicle in accordance with claim 19 wherein the vehicle is a truck-type vehicle and an operator interactive portion of said control means is located at least in part in the cab of the truck-type vehicle.

21. A system for auxiliary steering of a transport-type vehicle in accordance with claim 20 wherein such vehicle is an articulated tractor trailer combination and the dual axles associated with the system are two adjacent axles positioned at the rear of the trailer.

22. A system for auxiliary steering of a truck-type vehicle in accordance with claim 21 additionally comprising a slide means mounting at least one of the dual wheel assemblies to provide such dual wheel assembly with longitudinal displacement away from the other dual wheel assembly.

23. A system for auxiliary steering of a transport-type vehicle in accordance with claim 21 additionally comprising a control means that may be interacted with by an operator from at least two points on the tractor trailer one at least of which is positioned at a location from which an operator can conveniently observe the operation of the auxiliary steering apparatus during use of the apparatus for auxiliary steering.

24. A kit for retrofitting an auxiliary rear steering system to a dual rear axle tractor trailer combination comprising:
  (a) a transversely rotatable mounting means for mounting one dual axle to the trailer body,
  (b) a power means for interengagement between the trailer body and the rotatable mounting means to effect rotation of said rotatable mounting means,
  (c) a locking means having elements for attachment to the trailer body and said rotatable mounting means for locking said rotatable mounting means in a predetermined relationship with the tractor body,
  (d) control means for sequentially activating the power means and a vertical movement activation means provided for moving at least one of said dual axles to first remove weight from said rotatable mounting means and then turning said mounting.

25. A kit for retrofitting an auxiliary rear steering system to the trailer of a tractor trailer in accordance with claim 24 wherein:
  (i) the transversely rotatable mounting means comprises two round steering plates and a steering pin,
  (ii) the power means for rotating said rotatable mounting means comprises a two way double acting hydraulic cylinder and a hydraulic pump provided with electric motor activation,
  (iii) the locking means comprises two half radius curved I-beams and two pin-type means to interlock the two together.

26. A kit for retrofitting an auxiliary rear steering system to the trailer of a tractor trailer in accordance with claim 25 additionally comprising:
  (e) at least four miscellaneous solenoid valves for use as part of the control means,
  (f) at least two air regulators for use as part of the control means,
  (g) a substantial predetermined length of multiwire electrical cable for interconnecting a control station on the tractor trailer and the solenoid valves,
  (h) a multiwire trailer plug for disconnectably interengaging a control station and the remainder of the control means,
  (i) latching lips secured to one of the steering beams,
  (j) a plurality of suitable switches for mounting upon a dash panel provided with suitable indicator means at a control station of said control means.

27. In a tractor trailer combination having dual rear axles on the trailer designed for over-the-highway operation with fixedly transversely disposed axles closely spaced in order to minimize scuffing and wear when negotiating a curve or corner, a means for allowing auxiliary steering of the rear of the trailer comprising:
(a) a rotatable mounting for one of said axles to facilitate transverse rotational movement of said axle,
(b) a means for forcefully vertically moving at least one of the axles such that the weight of the truck can be substantially supported consecutively upon the vertically movable axle and upon the other axle in a predetermined sequence,
(c) power means for rotating the rotatable mounting to rotate the axle mounted thereupon to a desired angle which may be from a right angle with respect to the longitudinal axis of said trailer to an angle within less than ninety degrees of said longitudinal axis while the weight of the trailer and any load thereupon is supported upon the other axle,
(d) means to lock the rotatable mounting in both straight ahead and rotated position, and
(e) power means to move the truck longitudinally while the rotatable mounting is rotated and the weight of the truck is substantially supported upon the rotated axle whereby the rear of the trailer component of the tractor trailer combination can be moved partially to the side in the direction in which the rotatable mounting of the axle is directed.

28. A tractor trailer combination according to claim 27 wherein the rotatable mounting is associated with one of the dual axles and the vertical movement means is associated with the other dual axle.

29. A tractor trailer combination according to claim 27 wherein both the rotatable mounting and the vertical movement means are associated with the same dual axle.

30. A tractor trailer combination according to either claim 28 or 29 additionally comprising a means for additionally longitudinally, but temporarily spacing the dual axles during use of the rotational mounting of the one axle to move the rear of the trailer to the side.

31. A rear steering arrangement for a transport-type vehicle comprising:
(a) pivoted mounting means for at least one of several multiple tire wheel assemblies at the rear of the vehicle each such assembly including an axle upon which multiple wheels are journaled,
(b) the pivot point of said mounting means being located substantially forward of the axle upon which the multiple wheels of the assembly are journaled forming a pivotally mounted multiple wheel assembly,
(c) means to at least partially relieve the weight of the transport-type vehicle from the pivotally mounted multiple wheel assembly, and
(d) power means to pivot the multiple wheel assembly mounting while the weight of the truck body is at least partially relieved from such multiple wheel assembly, and
(e) means to lock the pivoted mounting for multiple wheel assembly at a predetermined angle in the pivoted position as well as in transverse position at right angles to the longitudinal axis of the truck.

32. A rear steering arrangement for a transport-type vehicle in accordance with claim 31 wherein the weight of the transport-type vehicle is relieved from the pivotally mounted multiple wheel assembly by vertical adjustment of an adjacent multiple wheel assembly provided with a vertical adjustment means for vertically moving such adjacent multiple wheel assembly.

33. A rear steering arrangement in accordance with claim 32 additionally comprising:
(f) a control system for sequentially activating the vertical adjustment means and the means to pivot the multiple wheel assembly of the steering arrangement.

34. A rear steering arrangement in accordance with claim 31 wherein the vertical adjustment means for vertically moving the multiple wheel assembly is a pneumatic air bag assembly.

35. A rear steering arrangement in accordance with claim 32 additionally comprising:
(g) means for actively lifting the pivotally mounted multiple wheel assembly at least partially from the road surface prior to and while it is being turned.

36. A rear steering arrangement in accordance with claim 35 wherein the means for actively lifting the pivotable multiple wheel assembly from the road surface is a pneumatic extension means operatively attached to the body of the transport-type vehicle and to the pivoted mounting means for the wheel assembly.

37. A rear steering arrangement for a truck comprising:
(a) a pivoted mounting for a wheel assembly of at least one of several multiple wheel tire assemblies at the rear of the truck,
(b) the pivot mechanism for such pivoted mounting being comprised of a top, middle and bottom plate, the middle plate being secured at least indirectly to structural members on the bottom of the truck, and the bottom plate being secured at least indirectly to an axle mounting forwardly of the axle and having a substantially round raised central portion having a dimension designed to fit snuggly but rotatably in a substantially round orifice within the center of the middle plate, the top plate being secured to the raised portion of the lower plate by fastener means and having a greater diameter than the orifice within the center of the middle plate, and
(c) a bearing means provided at the rear of the pivoted assembly comprise of an upper arcuate beam secured at least indirectly to structural members on the bottom of the truck and a lower arcuate beam secured to the pivoted assembly in a position to remain adjacent to but circumferentially movable with respect to the upper curved beam during pivoting of the pivoted assembly.

* * * * *